(12) United States Patent
Suzuki et al.

(10) Patent No.: US 10,856,279 B2
(45) Date of Patent: Dec. 1, 2020

(54) TERMINAL DEVICE, BASE STATION DEVICE AND RADIO COMMUNICATION METHOD

(71) Applicant: Sharp Kabushiki Kaisha, Sakai (JP)

(72) Inventors: Shoichi Suzuki, Sakai (JP); Yosuke Akimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/828,470

(22) Filed: Dec. 1, 2017

(65) Prior Publication Data

US 2018/0092074 A1 Mar. 29, 2018

Related U.S. Application Data

(63) Continuation of application No. 15/340,041, filed on Nov. 1, 2016, now Pat. No. 9,867,179, which is a
(Continued)

(51) Int. Cl.
*H04W 72/04* (2009.01)
*H04L 25/02* (2006.01)
(Continued)

(52) U.S. Cl.
CPC ......... *H04W 72/042* (2013.01); *H04L 5/0048* (2013.01); *H04L 5/0051* (2013.01);
(Continued)

(58) Field of Classification Search
CPC ........... H04W 72/042; H04W 72/1289; H04W 88/08; H04W 88/02; H04W 74/0833; H04L 5/0048; H04L 5/0051; H04L 5/0091
See application file for complete search history.

(56) References Cited

U.S. PATENT DOCUMENTS 8,380,135 B2 * 2/2013 Ko .................. H04B 7/0691
455/550.1
8,867,478 B2 * 10/2014 Nayeb Nazar ........ H04L 1/1812
370/330
(Continued)

FOREIGN PATENT DOCUMENTS

EP 1 865 733 A1 12/2007
EP 2 056 515 A1 5/2009

OTHER PUBLICATIONS

Suzuki et al., "Terminal Device, Base Station Device and Radio Communication Method", U.S. Appl. No. 15/340,041, filed Nov. 1, 2016.
(Continued)

*Primary Examiner* — Rasheed Gidado
(74) *Attorney, Agent, or Firm* — Keating & Bennett, LLP

(57) ABSTRACT

In a radio communication system using OCC for DMRS, a base station apparatus correctly receives PUSCH. If a first mode is set in which a demodulation reference signal of a physical uplink shared channel is multiplied by an orthogonal code determined in advance or if a temporary C-RNTI was used for a transmission of downlink control information, the demodulation reference signal of the physical uplink shared channel is multiplied by the orthogonal code determined in advance, and if a second mode is set in which the demodulation reference signal of the physical uplink shared channel is multiplied by an orthogonal code determined on the basis of cyclic shift information in the downlink control information and moreover, if an RNTI other than the temporary C-RNTI was used for the transmission of the downlink control information, the demodulation reference signal of the physical uplink shared channel is multiplied by the orthogonal code determined on the basis of the cyclic shift information in the downlink control information.

4 Claims, 13 Drawing Sheets

Related U.S. Application Data continuation of application No. 14/996,616, filed on Jan. 15, 2016, now Pat. No. 9,516,643, which is a continuation of application No. 14/535,531, filed on Nov. 7, 2014, now Pat. No. 9,271,285, which is a continuation of application No. 13/700,323, filed as application No. PCT/JP2011/061679 on May 20, 2011, now Pat. No. 8,902,841.

(51) Int. Cl.
| | |
|---|---|
| *H04L 5/00* | (2006.01) |
| *H04W 72/12* | (2009.01) |
| *H04J 13/00* | (2011.01) |
| *H04W 74/08* | (2009.01) |
| *H04W 88/02* | (2009.01) |
| *H04W 88/08* | (2009.01) |

(52) U.S. Cl.
CPC ........ *H04L 5/0091* (2013.01); *H04L 25/0224* (2013.01); *H04W 72/1289* (2013.01); *H04J 13/0059* (2013.01); *H04W 74/0833* (2013.01); *H04W 88/02* (2013.01); *H04W 88/08* (2013.01)

(56) References Cited

U.S. PATENT DOCUMENTS

| | | | | |
|---|---|---|---|---|
| 8,891,493 B2* | 11/2014 | Inoue | ................... | H04B 1/707 370/335 |
| 8,995,376 B2* | 3/2015 | Pan | ................... | H04L 5/001 370/329 |
| 2009/0323957 A1 | 12/2009 | Luo et al. | | |
| 2010/0034161 A1* | 2/2010 | Luo | ................... | H04B 1/707 370/329 |
| 2010/0118807 A1 | 5/2010 | Seo et al. | | |
| 2010/0190447 A1* | 7/2010 | Agrawal | ............ | H04W 72/082 455/63.1 |
| 2010/0279628 A1* | 11/2010 | Love | ................... | H04L 5/003 455/70 |
| 2010/0331030 A1* | 12/2010 | Nory | ................... | H04L 5/0053 455/509 |
| 2011/0222501 A1* | 9/2011 | Kim | ................... | H04L 1/0041 370/329 |
| 2011/0255486 A1* | 10/2011 | Luo | ................... | H04W 48/12 370/329 |
| 2011/0271169 A1* | 11/2011 | Pi | ................... | H03M 13/09 714/807 |
| 2013/0022005 A1* | 1/2013 | Yano | ................... | H04L 1/0046 370/329 |
| 2013/0028134 A1 | 1/2013 | Wang et al. | | |

OTHER PUBLICATIONS

Noh et al., "Cyclic Shift Allocation to Avoid Phich Collision on UL MU-MIMO", U.S. Appl. No. 61/290,013, filed Dec. 24, 2009.

Qualcomm Incorporated, "Conveying OCC for PUSCH Transmissions", 3GPP TSG-RAN WG1 #61, R1-102764, May 10-14, 2010, pp. 1-5.

LG Electronics, "Initial Random Access in LTE-Advanced", 3GPP TSG RAN WG1 Meeting #57bis, R1-092506, Jun. 29-Jul. 3, 2009. 4 pages.

"3rd Generation Partnership Project; Technical Specification Group Radio Access Network; Evolved Universal Terrestrial Radio Access (E-UTRA); Physical layer procedures (Release 9)", 3GPP TS 36.213 V9.1.0, Mar. 2010, pp. 1-79.

\* cited by examiner

| UPLINK TRANSMISSION MODE | COMMON SEARCH SPACE | | | MOBILE STATION APPARATUS SPECIFIC SEARCH SPACE | | |
|---|---|---|---|---|---|---|
| | FORMAT | RNTI | OCC | FORMAT | RNTI | OCC |
| MODE 1 | DCI FORMAT 0 | C-RNTI | INVALID | DCI FORMAT 0 | C-RNTI | INVALID |
| | | SPS C-RNTI | | | SPS C-RNTI | |
| | | T C-RNTI | | | | |
| MODE 2 | DCI FORMAT 0 | C-RNTI | VALID | DCI FORMAT 0, DCI FORMAT 0A | C-RNTI | VALID |
| | | SPS C-RNTI | VALID ONLY FOR RETRANSMISSION | | SPS C-RNTI | VALID ONLY FOR RETRANSMISSION |
| | | T C-RNTI | INVALID | | | |

FIG.5

| CYCLIC SHIFT INFORMATION | CYCLIC SHIFT |
| --- | --- |
| 000 | 0 |
| 001 | 6 |
| 010 | 3 |
| 011 | 4 |
| 100 | 2 |
| 101 | 8 |
| 110 | 10 |
| 111 | 9 |

FIG.6

| CYCLIC SHIFT INFORMATION | CYCLIC SHIFT | OCC |
|---|---|---|
| 000 | 0 | [1,1] |
| 001 | 6 | [1,1] |
| 010 | 3 | [1,-1] |
| 011 | 4 | [1,1] |
| 100 | 2 | [1,-1] |
| 101 | 8 | [1,-1] |
| 110 | 10 | [1,1] |
| 111 | 9 | [1,-1] |

FIG.7

| UPLINK TRANSMISSION MODE | COMMON SEARCH SPACE | | | MOBILE STATION APPARATUS SPECIFIC SEARCH SPACE | | |
|---|---|---|---|---|---|---|
| | FORMAT | RNTI | OCC | FORMAT | RNTI | OCC |
| MODE 1 | DCI FORMAT 0 | C-RNTI | INVALID | DCI FORMAT 0 | C-RNTI | INVALID |
| | | SPS C-RNTI | | | SPS C-RNTI | VALID |
| | | T C-RNTI | | | | |
| MODE 2 | DCI FORMAT 0 | C-RNTI | INVALID | DCI FORMAT 0, DCI FORMAT 0A | C-RNTI | VALID |
| | | SPS C-RNTI | | | SPS C-RNTI | VALID ONLY FOR RETRANSMISSION |
| | | T C-RNTI | | | | |

FIG.10

TERMINAL DEVICE, BASE STATION DEVICE AND RADIO COMMUNICATION METHOD

TECHNICAL FIELD

The present invention relates to a radio communication system, a base station apparatus, a mobile station apparatus, a radio communication method, and an integrated circuit.

BACKGROUND ART

Evolution of a radio access method and a radio network of a cellular mobile communication (hereinafter referred to as "Long Term Evolution (LTE)" or "Evolved Universal Terrestrial Radio Access (EUTRA)") is being examined in the 3rd Generation Partnership Project (3GPP). In the LTE, as a communication system for radio communication (downlink) from a base station apparatus to a mobile station apparatus, the Orthogonal Frequency Division Multiplexing (OFDM) system which is a multiple-carrier transmission is used. In addition, as a communication system of the radio communication (uplink) from the mobile station apparatus to the base station apparatus, the Single-Carrier Frequency Division Multiple Access (SC-FDMA) system which is a single-carrier transmission is used.

In the LTE, the base station apparatus instructs the mobile station apparatus to perform initial transmission or retransmission of PUSCH (Physical Uplink Shared Channel) which is a channel for uplink data (or referred to as "uplink shared channel: UL-SCH") transmission by using Downlink Control Information (DCI) transmitted via PDCCH (Physical Downlink Control Channel). In the LTE, the mobile station apparatus transmits PUSCH by using one transmission antenna port.

In the LTE-A, use of SU (single user)-MIMO (Multiple Input Multiple Output) for the PUSCH is being examined in order to improve spectrum efficiency of the uplink. By using the SU-MIMO, the mobile station apparatus can spatially multiplex a plurality of pieces of uplink data in one PUSCH and transmit it by using a plurality of antenna ports. In the LTE, MU (multi user)-MIMO is used which is a technology to improve the spectrum efficiency in which a plurality of the mobile station apparatuses transmits data at the same time and the same frequency and the base station apparatus, when receiving the data, separates data of one or more sequences transmitted by each of the mobile station apparatuses, but in the LTE-A, expansion of the functions of MU-MIMO is being examined.

In the LTE, a cyclic shift has been introduced to a reference signal (Demodulation Reference Signal: DMRS) used for channel estimation and transmitted together with the PUSCH in order to reduce interference. Non-Patent Document 1 describes introduction of OCC (Orthogonal Cover Code) into the DMRS in order to further reduce interference of the DMRS during SU-MIMO and MU-MIMO. Moreover, Non-Patent Document 1 describes that information relating to the cyclic shift used for the DMRS and included in the downlink control information for the PUSCH is associated with the OCC used for the DMRS.

PRIOR ART DOCUMENT

Non-Patent Document

Non-patent Document 1: "OCC and CS for UL DMRS in SU/MU-MIMO", 3GPP TSG RAN WG1 Meeting #60, R1-101267, Feb. 22 to 26, 2010

DISCLOSURE OF THE INVENTION

Problems to be Solved by the Invention

However, in the prior-art technology, if the base station apparatus can no longer recognize whether the mobile station apparatus operates as the LTE and the OCC is not used for the DMRS or the mobile station apparatus operates as the LTE-A and the OCC is used for the DMRS, the base station apparatus cannot correctly perform the channel estimation from the DMRS transmitted by the mobile station apparatus, and a problem occurs that the PUSCH cannot be received.

The present invention was made in view of the above problem and has an object to provide a mobile station apparatus, a base station apparatus, a radio communication system, a radio communication method, and an integrated circuit in which the base station apparatus can correctly receive the PUSCH in a radio communication system using the OCC for the DMRS.

Means for Solving the Problems (1) In order to achieve the above-described object, an embodiment of the present invention takes the following measures. That is, a mobile station apparatus of an embodiment of the present invention is a mobile station apparatus that communicates with a base station apparatus, wherein: when the mobile station apparatus decodes downlink control information in a predetermined format used for scheduling of a physical uplink shared channel, if a first mode is set in which a demodulation reference signal of the physical uplink shared channel is multiplied by an orthogonal code determined in advance or if a temporary C-RNTI was used for a transmission of the downlink control information, the mobile station apparatus decodes multiplies the demodulation reference signal of the physical uplink shared channel scheduled by the downlink control information by the orthogonal code determined in advance, and when the mobile station apparatus decodes the downlink control information in the predetermined format used for scheduling of the physical uplink shared channel, if a second mode is set in which the demodulation reference signal of the physical uplink shared channel is multiplied by an orthogonal code determined on the basis of cyclic shift information in the downlink control information and moreover, if an RNTI other than the temporary C-RNTI was used for the transmission of the downlink control information, the mobile station apparatus decodes multiplies the demodulation reference signal of the physical uplink shared channel scheduled by the downlink control information by the orthogonal code determined on the basis of the cyclic shift information in the downlink control information.

(2) Moreover, in the mobile station apparatus of an embodiment of the present invention, the RNTI other than the temporary C-RNTI is a C-RNTI or an SPS C-RNTI.

(3) In addition, in the mobile station apparatus of an embodiment of the present invention, the downlink control information in the predetermined format is information for scheduling the physical uplink shared channel transmitted on a single antenna port.

(4) Moreover, in the mobile station apparatus of an embodiment of the present invention, the first mode or the second mode is set in accordance with an RRC signal received from the base station apparatus.

(5) Furthermore, in the mobile station apparatus of an embodiment of the present invention, the first mode is set until the RRC signal is received from the base station apparatus.

(6) Moreover, in the mobile station apparatus of an embodiment of the present invention, the temporary C-RNTI is included in a random access response including a random access preamble identifier transmitted by the mobile station apparatus to the base station apparatus.

(7) In addition, in the mobile station apparatus of an embodiment of the present invention, the downlink control information including the RNTI other than the temporary C-RNTI is decoded in a common search space and/or a mobile station apparatus specific search space and the downlink control information including the temporary C-RNTI is decoded in the common search space.

(8) Moreover, in the mobile station apparatus of an embodiment of the present invention, the common search space is a space constituted by a predetermined control channel element; and the mobile station apparatus specific search space is a space constituted by a control channel element determined on the basis of a C-RNTI which is the RNTI other than the temporary C-RNTI.

(9) Furthermore, in the mobile station apparatus of an embodiment of the present invention, when the mobile station apparatus decodes the downlink control information in a format used for scheduling of the physical uplink shared channel other than the predetermined format, the mobile station apparatus multiplies the demodulation reference signal of the physical uplink shared channel scheduled by the downlink control information in the format other than the predetermined format by the orthogonal code determined on the basis of the cyclic shift information in the downlink control information in the format other than the predetermined format.

(10) Moreover, in the mobile station apparatus of an embodiment of the present invention, the downlink control information in the format other than the predetermined format is information for scheduling the physical uplink shared channel transmitted on a plurality of the antenna ports.

(11) In addition, the mobile station apparatus of an embodiment of the present invention is a mobile station apparatus that communicates with a base station apparatus, wherein: the mobile station apparatus, on the basis of an RNTI used for the transmission of downlink control information in a predetermined format used for scheduling of a physical uplink shared channel, multiplies a demodulation reference signal of the physical uplink shared channel scheduled by the downlink control information by an orthogonal code determined in advance, or multiplies the demodulation reference signal of the physical uplink shared channel scheduled by the downlink control information by an orthogonal code determined on the basis of cyclic shift information in the downlink control information.

(12) Moreover, the mobile station apparatus of an embodiment of the present invention is a mobile station apparatus that communicates with a base station apparatus, wherein: the mobile station apparatus sets, in accordance with an RRC signal received from the base station apparatus, a first mode in which the mobile station apparatus, when decoding downlink control information in a format used for scheduling of a physical uplink shared channel transmitted on a single antenna port, multiplies a demodulation reference signal of the physical uplink shared channel scheduled by the downlink control information by an orthogonal code determined in advance, or a second mode in which the mobile station apparatus, when decoding the downlink control information in the format used for scheduling of the physical uplink shared channel transmitted on a single antenna port, multiplies the demodulation reference signal of the physical uplink shared channel scheduled by the downlink control information by an orthogonal code determined on the basis of cyclic shift information in the downlink control information.

(13) Furthermore, the base station apparatus of an embodiment of the present invention is a base station apparatus that communicates with a mobile station apparatus, wherein: when the base station apparatus transmits downlink control information in a predetermined format used for scheduling of a physical uplink shared channel to the mobile station apparatus, if a first mode is set, to said mobile station apparatus, in which the mobile station apparatus multiplies a demodulation reference signal of the physical uplink shared channel scheduled by the downlink control information in the predetermined format by an orthogonal code determined in advance or if a temporary C-RNTI was used for the a transmission of the downlink control information, the base station apparatus receives, from the mobile station apparatus, the demodulation reference signal of the physical uplink shared channel multiplied, by the mobile station apparatus, by the orthogonal code determined in advance; and when the base station apparatus transmits the downlink control information in the predetermined format used for the scheduling of the physical uplink shared channel to the mobile station apparatus, if a second mode is set, to said mobile station apparatus, in which the mobile station apparatus multiplies the demodulation reference signal of the physical uplink shared channel scheduled by the downlink control information in the predetermined format by an orthogonal code determined on the basis of cyclic shift information in the downlink control information, and if an RNTI other than the temporary C-RNTI was used for the transmission of the downlink control information, the base station apparatus receives, from the mobile station apparatus, the demodulation reference signal of the physical uplink shared channel multiplied by the orthogonal code determined by the mobile station apparatus on the basis of the cyclic shift information in the downlink control information.

(14) Moreover, in the base station apparatus of an embodiment of the present invention, the RNTI other than the temporary C-RNTI is a C-RNTI or an SPS C-RNTI.

(15) In addition, in the base station apparatus of an embodiment of the present invention, the downlink control information in the predetermined format is information for scheduling the physical uplink shared channel transmitted by using a single antenna port.

(16) Moreover, in the base station apparatus of an embodiment of the present invention, an RRC signal indicating the first mode or the second mode is transmitted to the mobile station apparatus.

(17) Furthermore, in the base station apparatus of an embodiment of the present invention, the mobile station apparatus is considered to set the first mode until the RRC signal is transmitted to the mobile station apparatus.

(18) Moreover, in the base station apparatus of an embodiment of the present invention, the temporary C-RNTI is included in a random access response including a random access preamble identifier transmitted by the mobile station apparatus to the base station apparatus.

(19) In addition, in the base station apparatus of an embodiment of the present invention, the downlink control information including the RNTI other than the temporary C-RNTI is transmitted in a common search space and/or a mobile station apparatus specific search space and the downlink control information including the temporary C-RNTI is transmitted in the common search space.

(20) Moreover, in the base station apparatus of an embodiment of the present invention, the common search space is a space constituted by a predetermined control channel element, and the mobile station apparatus specific search space is a space constituted by a control channel element determined on the basis of a C-RNTI which is the RNTI other than the temporary C-RNTI.

(21) Furthermore, in the base station apparatus of an embodiment of the present invention, when the base station apparatus transmits the downlink control information in a format used for scheduling of the physical uplink shared channel other than the predetermined format to the mobile station apparatus, the base station apparatus receives the demodulation reference signal of the physical uplink shared channel which is multiplied by the orthogonal code determined by the mobile station apparatus on the basis of the cyclic shift information in the downlink control information in the format other than the predetermined format, and the physical uplink shared channel is scheduled by the downlink control information in the format other than the predetermined format.

(22) Moreover, in the base station apparatus of an embodiment of the present invention, the downlink control information in the format other than the predetermined format is information for scheduling the physical uplink shared channel transmitted on a plurality of the antenna ports.

(23) In addition, the base station apparatus of an embodiment of the present invention is a base station apparatus that communicates with a mobile station apparatus, wherein the base station apparatus, in accordance with an RNTI used for the transmission of downlink control information used for scheduling of a physical uplink shared channel, receives a demodulation reference signal of the physical uplink shared channel scheduled by the downlink control information, which is multiplied, by the mobile station apparatus, by an orthogonal code determined in advance, or receives the demodulation reference signal of the physical uplink shared channel scheduled by the downlink control information, which is multiplied by an orthogonal code determined by the mobile station apparatus on the basis of cyclic shift information in the downlink control information.

(24) Moreover, the base station apparatus of an embodiment of the present invention is a base station apparatus that communicates with a mobile station apparatus, wherein the base station apparatus, in accordance with a mode indicated by an RRC signal transmitted to the mobile station apparatus, receives, when transmitting downlink control information in a format used for scheduling of a physical uplink shared channel transmitted on a single antenna port to said mobile station apparatus, a demodulation reference signal of the physical uplink shared channel which is scheduled by said downlink control information, and the demodulation reference signal is multiplied, by said mobile station apparatus, by an orthogonal code determined in advance, or receives, when transmitting the downlink control information in the format used for scheduling of the physical uplink shared channel transmitted by using a single antenna port to said mobile station apparatus, the demodulation reference signal of the physical uplink shared channel which is scheduled by said downlink control information, and the demodulation reference signal is multiplied by an orthogonal code determined on the basis of cyclic shift information in said downlink control information by said mobile station apparatus.

(25) Furthermore, the radio communication system of an embodiment of the present invention is a radio communication system in which a mobile station apparatus and abase station apparatus communicate with each other, wherein the mobile station apparatus, when decoding downlink control information in a predetermined format used for scheduling of a physical uplink shared channel, if a first mode is set in which a demodulation reference signal of the physical uplink shared channel scheduled by the downlink control information in the predetermined format is multiplied by an orthogonal code determined in advance, or if a temporary C-RNTI was used for a transmission of the downlink control information, multiplies the demodulation reference signal of the physical uplink shared channel by the orthogonal code determined in advance; and when decoding the downlink control information in a predetermined format used for scheduling of the physical uplink shared channel, if a second mode is set in which the demodulation reference signal of the physical uplink shared channel scheduled by the downlink control information in the predetermined format is multiplied by an orthogonal code determined on the basis of cyclic shift information in the downlink control information, and moreover, if an RNTI other than the temporary C-RNTI was used for the transmission of the downlink control information, multiplies the demodulation reference signal of the physical uplink shared channel by the orthogonal code determined on the basis of the cyclic shift information in the downlink control information, and transmits the demodulation reference signal of the physical uplink shared channel to the base station apparatus; and wherein the base station apparatus, when transmitting the downlink control information in a predetermined format used for scheduling of the physical uplink shared channel to the mobile station apparatus, if a first mode is set, to said mobile station apparatus, in which the mobile station apparatus multiplies the demodulation reference signal of the physical uplink shared channel scheduled by the downlink control information in the predetermined format by the orthogonal code determined in advance or if the temporary C-RNTI was used for the transmission of the downlink control information, receives, from the mobile station apparatus, the demodulation reference signal of the physical uplink shared channel multiplied by the orthogonal code determined in advance by the mobile station apparatus; and when transmitting the downlink control information in a predetermined format used for scheduling of the physical uplink shared channel to the mobile station apparatus, if a second mode is set, to said mobile station apparatus, in which the mobile station apparatus multiplies the demodulation reference signal of the physical uplink shared channel scheduled by the downlink control information in the predetermined format by the orthogonal code determined on the basis of the cyclic shift information in the downlink control information, and if the RNTI other than the temporary C-RNTI was used for the transmission of the downlink control information, receives, from the mobile station apparatus, the demodulation reference signal of the physical uplink shared channel multiplied by the orthogonal code determined on the basis of the cyclic shift information in the downlink control information by the mobile station apparatus.

(26) Moreover, the radio communication method of an embodiment of the present invention is a radio communication method used in a mobile station apparatus that communicates with a base station apparatus, the method comprising the steps of: when decoding downlink control information in a predetermined format used for scheduling of a physical uplink shared channel, if a first mode is set in which a demodulation reference signal of the physical uplink shared channel is multiplied by an orthogonal code determined in advance or if a temporary C-RNTI was used for a transmission of the downlink control information, multiplying the demodulation reference signal of the physical uplink shared channel scheduled by the downlink control information by the orthogonal code determined in advance, and when decoding the downlink control information in the predetermined format used for scheduling of the physical uplink shared channel, if a second mode is set in which the demodulation reference signal of the physical uplink shared channel is multiplied by an orthogonal code determined on the basis of cyclic shift information in the downlink control information and moreover, if an RNTI other than the temporary C-RNTI was used for the transmission of the downlink control information, multiplying the demodulation reference signal of the physical uplink shared channel scheduled by the downlink control information by the orthogonal code determined on the basis of the cyclic shift information in the downlink control information.

(27) In addition, the radio communication method of an embodiment of the present invention is a radio communication method used in a base station apparatus communicating with a mobile station apparatus, the method controlling processing of the base station apparatus of: when transmitting downlink control information in a predetermined format used for scheduling of a physical uplink shared channel to the mobile station apparatus, if a first mode is set, to said mobile station apparatus, in which the mobile station apparatus multiplies a demodulation reference signal of the physical uplink shared channel scheduled by the downlink control information in the predetermined format by an orthogonal code determined in advance or if a temporary C-RNTI was used for a transmission of the downlink control information, receiving the demodulation reference signal of the physical uplink shared channel multiplied, by the mobile station apparatus, by the orthogonal code determined in advance; and when transmitting the downlink control information in the predetermined format used for the scheduling of the physical uplink shared channel to the mobile station apparatus, if a second mode is set, to said mobile station apparatus, in which the mobile station apparatus multiplies the demodulation reference signal of the physical uplink shared channel scheduled by the downlink control information in the predetermined format by an orthogonal code determined on the basis of cyclic shift information in the downlink control information, and if an RNTI other than the temporary C-RNTI was used for the transmission of the downlink control information, receiving the demodulation reference signal of the physical uplink shared channel multiplied by the orthogonal code determined by the mobile station apparatus on the basis of the cyclic shift information in the downlink control information.

(28) Moreover, the integrated circuit of an embodiment of the present invention is an integrated circuit used in a mobile station apparatus that communicates with a base station apparatus, wherein the integrated circuit, when decoding downlink control information in a predetermined format used for scheduling of a physical uplink shared channel, if a first mode is set in which a demodulation reference signal of the physical uplink shared channel is multiplied by an orthogonal code determined in advance or if a temporary C-RNTI was used for a transmission of the downlink control information, multiplies the demodulation reference signal of the physical uplink shared channel scheduled by the downlink control information by the orthogonal code determined in advance, and when decoding the downlink control information in the predetermined format used for scheduling of the physical uplink shared channel, if a second mode is set in which the demodulation reference signal of the physical uplink shared channel is multiplied by an orthogonal code determined on the basis of cyclic shift information in the downlink control information and moreover, if an RNTI other than the temporary C-RNTI was used for the transmission of the downlink control information, multiplies the demodulation reference signal of the physical uplink shared channel scheduled by the downlink control information by the orthogonal code determined on the basis of the cyclic shift information in the downlink control information.

(29) Furthermore, the integrated circuit of an embodiment of the present invention is an integrated circuit used in a base station apparatus that communicates with a mobile station apparatus, wherein the integrated circuit controls processing of the base station apparatus of: when transmitting downlink control information in a predetermined format used for scheduling of a physical uplink shared channel to the mobile station apparatus, if a first mode is set, to said mobile station apparatus, in which the mobile station apparatus multiplies a demodulation reference signal of the physical uplink shared channel scheduled by the downlink control information in the predetermined format by an orthogonal code determined in advance or if a temporary C-RNTI was used for a transmission of the downlink control information, receiving the demodulation reference signal of the physical uplink shared channel multiplied, by the mobile station apparatus, by the orthogonal code determined in advance; and when transmitting the downlink control information in the predetermined format used for the scheduling of the physical uplink shared channel to the mobile station apparatus, if a second mode is set, to said mobile station apparatus, in which the mobile station apparatus multiplies the demodulation reference signal of the physical uplink shared channel scheduled by the downlink control information in the predetermined format by an orthogonal code determined on the basis of cyclic shift information in the downlink control information, and if an RNTI other than the temporary C-RNTI was used for the transmission of the downlink control information, receiving the demodulation reference signal of the physical uplink shared channel multiplied by the orthogonal code determined by the mobile station apparatus on the basis of the cyclic shift information in the downlink control information.

Effect of the Invention

According to the present invention, in the radio communication system using OCC for DMRS, the base station apparatus can correctly receive the PUSCH.

BRIEF DESCRIPTION OF THE DRAWINGS

FIG. 5 is a diagram illustrating a relationship between an uplink grant and an OCC applied to DMRS in an embodiment of the present invention.

FIG. 6 is a diagram illustrating a relationship between cyclic shift information and a cyclic shift applied to the DMRS in an embodiment of the present invention.

FIG. 7 is a diagram illustrating a relationship among the cyclic shift information, the cyclic shift applied to the DMRS and the OCC in an embodiment of the present invention.

FIG. 10 is a diagram illustrating a relationship between an uplink grant and the OCC applied to the DMRS in a second embodiment of the present invention.

BEST MODES FOR CARRYING OUT THE INVENTION

First Embodiment

A first embodiment of the present invention will be described below in detail by referring to the attached drawings.

First, a physical channel of the present invention will be described.

Figure 11:
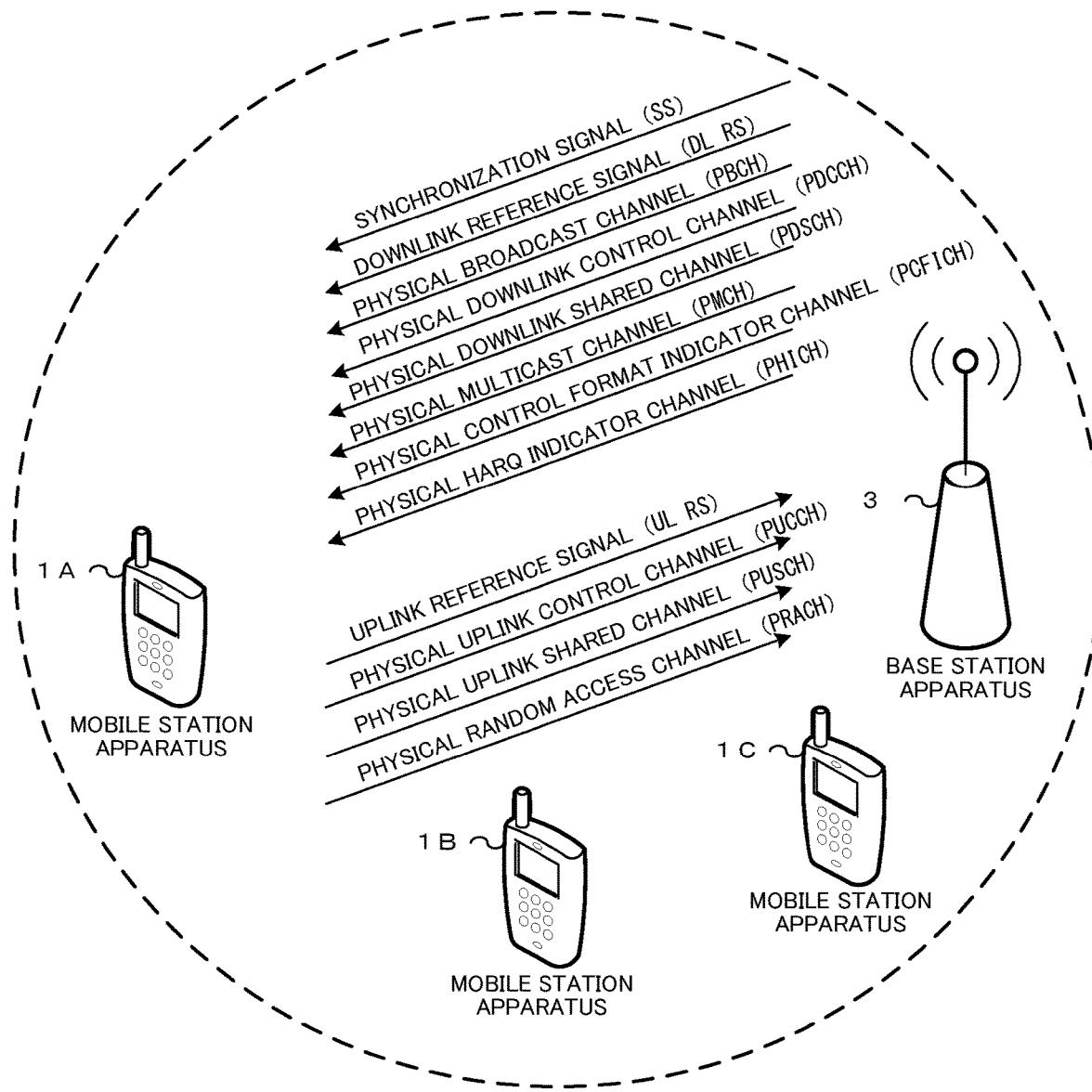
FIG. 11 is a conceptual diagram of a radio communication system according to a first embodiment of the present invention.

FIG. 11 is a conceptual diagram of a radio communication system according to the first embodiment of the present invention. In FIG. 11, the radio communication system includes mobile station apparatuses 1A to 1C and a base station apparatus 3. FIG. 11 illustrates assignment of a Synchronization Signal (SS), a Downlink Reference Signal (DL RS), a Physical Broadcast Channel (PBCH), a Physical Downlink Control Channel (PDCCH), a Physical Downlink Shared Channel (PDSCH), a Physical Multicast Channel (PMCH), a Physical Control Format Indicator Channel (PCFICH), and a Physical Hybrid ARQ Indicator Channel (PHICH) in the radio communication (downlink) from the base station apparatus 3 to the mobile station apparatuses 1A to 1C.

Moreover, FIG. 11 illustrates assignment of an Uplink Reference Signal (UL RS), a Physical Uplink Control Channel (PUCCH), a Physical Uplink Shared Channel (PUSCH), and a Physical Random Access Channel (PRACH) in the radio communication (uplink) from the mobile station apparatuses 1A to 1C to the base station apparatus 3. Hereinafter, the mobile station apparatuses 1A to 1C will be referred to as a mobile station apparatus 1.

The synchronization signal is a signal used for the mobile station apparatus 1 to synchronize in terms of a frequency domain and a time domain of the downlink. The downlink reference signal is a signal used for the mobile station apparatus 1 to synchronize in terms of the frequency domain and the time domain of the downlink, used for the mobile station apparatus 1 to measure reception quality of the downlink or used for the mobile station apparatus 1 to perform channel compensation of PDSCH and PDCCH. The PBCH is a physical channel used for broadcasting a control parameter (system information) (Broadcast Channel: BCH) used in common by the mobile station apparatus 1. The PBCH is transmitted at 40-ms interval. The timing at the 40-ms interval is blind-detected in the mobile station apparatus 1.

The PDCCH is a physical channel used for transmitting Downlink Control Information (DCI)) such as a downlink assignment (or also referred to as a downlink grant) and an uplink grant. The downlink assignment includes information relating to a modulation scheme and a coding rate of the PDSCH (Modulation and Coding Scheme: MCS), information indicating assignment of radio resources of the PDSCH and the like. The uplink grant includes information relating to the modulation scheme and the coding rate of the PUSCH, information indicating assignment of the radio resources of the PUSCH and the like.

A plurality of formats is used for the downlink control information. The format for the downlink control information is referred to as a DCI format. For example, for the DCI format for the uplink grant, a DCI format 0 used when the mobile station apparatus 1 transmits the PUSCH by using one transmission antenna port, a DCI format 0A used when the mobile station apparatus 1 transmits a plurality of pieces of uplink data by using MIMO SM (Multiple Input Multiple Output Spatial Multiplexing) for the PUSCH and the like are prepared. The mobile station apparatus 1 monitors the DCI format 0 and the DCI format 0A for the PDCCH at the same time, and if the DCI format 0 is detected, the PUSCH is transmitted by using one transmission antenna port, while if the DCI format 0A is detected, the PUSCH is transmitted by using a plurality of transmission antenna ports (MIMO SM).

The MIMO SM is a technology in which a plurality of signals is multiplexed and transmitted/received with respect to a channel of a plurality of spatial dimensions realized by a plurality of transmission antenna ports and a plurality of reception antenna ports. Here, the antenna port refers to a logical antenna used for signal processing. One antenna port may be composed of one physical antenna or may be composed of a plurality of physical antennas. On the transmission side using the MIMO SM, processing for forming a spatial channel appropriate for the plurality of signals (referred to as precoding) is executed, and a plurality of signals subjected to the precoding processing is transmitted by using the plurality of transmission antennas. On the reception side using the MIMO SM, processing for appropriately separating the signals multiplexed in the channel of spatial dimensions is performed on a plurality of signals received by using the plurality of reception antennas.

For example, the DCI format 0A includes information indicating assignment of the radio resources for the PUSCH (Resource block assignment), a TPC (Transmission Power Control) command used for transmit power control of the PUSCH, information used for determining a cyclic shift used for an uplink reference signal time-multiplexed with the PUSCH (hereinafter referred to as cyclic shift information) (Cyclic shift for demodulation reference signal), information for indicating the number of space-multiplexed sequences and precoding performed on these sequences (precoding information), information relating to the modulation scheme, the coding method, and redundancy version (Modulation and Coding Scheme and Redundancy version: MCS&RV), and information indicating initial transmission or retransmission of the uplink data (New Data Indicator: NDI). The redundancy version is information indicating which part, in bit sequences in which the uplink data is encoded, is to be transmitted by the mobile station apparatus 1 in the PUSCH.

The MCS&RV and the NDI included in the DCI format 0A are prepared for each of the plurality of pieces of uplink data controlled by the DCI format 0A. That is, the base station apparatus 3 can set the transport block size, the modulation scheme, and the coding rate for each uplink data transmitted on the same PUSCH and can indicate initial transmission or retransmission to the mobile station apparatus 1 for each uplink data by using the DCI format 0A.

The encoding method of the downlink control information will be described. First, the base station apparatus 3 attaches, to the downlink control information, a sequence obtained by scrambling a Cyclic Redundancy Check (CRC) code generated on the basis of the downlink control information with a Radio Network Temporary Identifier (RNTI). The mobile station apparatus 1 changes interpretation of the downlink control information on the basis of with which RNTI the CRC code is scrambled.

For example, the mobile station apparatus 1, when the CRC code is scrambled with a C-RNTI (Cell-Radio Network Temporary Identity) assigned by the base station apparatus 3 to its own apparatus, determines that the downlink control information indicates a radio resource addressed to its own apparatus, while when the CRC code is scrambled with an SPS (Semi Persistent Scheduling) C-RNTI assigned by the base station apparatus 3 to its own apparatus, the mobile station apparatus 1 determines that the downlink control information indicates permanent (periodic) assignment of the radio resource to its own apparatus or release of the permanent radio resource or retransmission for the PUSCH transmitted by the permanent radio resource.

The mobile station apparatus 1, when the CRC code is scrambled with a T (Temporary) C-RNTI assigned to a random access preamble transmitted by its own apparatus in a random access message 2, determines that the downlink control information indicates the radio resource for retransmission of a random access message 3 transmitted by its own apparatus. The details of the random access will be described later.

Hereinafter, the fact that the CRC code scrambled with the RNTI is attached to the downlink control information is expressed simply as that the RNTI is included in the downlink control information or the RNTI is included in the PDCCH.

The mobile station apparatus 1 determines that the PDCCH is successfully obtained when the PDCCH is decode-processed, a sequence corresponding to the CRC code scrambled with the RNTI is descrambled with the RNTI stored in its own apparatus, and no error is detected on the basis of the descrambled CRC code. This processing is referred to as blind decoding.

The PDSCH is a physical channel used for transmitting paging information (Paging Channel: PCH) or system information not broadcasted in PBCH, that is, information other than BCH and downlink data (Downlink Shared Channel: DL-SCH). The PMCH is a physical channel used for transmitting information (Multicast Channel: MCH) relating to MBMS (Multimedia Broadcast and Multicast Service). The PCFICH is a physical channel used for transmitting information indicating a region in which the PDCCH is arranged. The PHICH is a physical channel used for transmitting the HARQ indicator indicating success/failure of decoding of the uplink data received by the base station apparatus 3.

When the base station apparatus 3 has succeeded in decoding all the uplink data included in the PUSCH, the HARQ indicator indicates ACK (ACKnowledgment), while when the base station apparatus 3 has failed in decoding at least one piece of uplink data included in the PUSCH, the HARQ indicator indicates NACK (Negative ACKnowledgment). It may be so configured that a plurality of the HARQ indicators indicating success/failure of decoding for each of the plurality of pieces of uplink data included in the same PUSCH is transmitted in a plurality of the PHICHs.

The uplink reference signal is a signal used for the base station apparatus 3 to synchronize with the time domain of the uplink, used for the base station apparatus 3 to measure reception quality of the uplink or used for the base station apparatus 3 to perform channel compensation of the PUSCH or PUCCH. The uplink reference signal is subjected to code spread using a CAZAC (Constant Amplitude and Zero Auto-Correlation) sequence in the radio resource divided assuming SC-FDMA.

The CAZAC sequence is a sequence which has constant amplitude in a time domain and a frequency domain and is excellent in auto-correlation characteristics. Since it has constant amplitude in the time domain, PAPR (Peak to Average Power Ratio) can be suppressed low. Cyclic delay is applied to the DMRS in the time domain. This cyclic delay in the time domain is referred to as a cyclic shift. The cyclic shift corresponds to phase rotation of the CAZAC sequence by the unit of a subcarrier in the frequency domain.

The uplink reference signal includes a DMRS (Demodulation Reference Signal) which is time-multiplexed with the PUSCH or the PUCCH and transmitted and which is used for channel compensation for the PUSCH and PUCCH, and an SRS (Sounding Reference Signal) which is transmitted independently from the PUSCH and PUCCH and which is used for the base station apparatus 3 to estimate channel state of the uplink. For the DMRS, not only the cyclic shift but also an OCC (Orthogonal Cover Code) is used. The OCC is a sequence (spread signal) in which the CAZAC sequence in the frequency domain is subjected to code spread by the unit of SC-FDMA symbol in the time domain. The SC-FDMA symbol in the time domain may be subjected to code-spread with the OCC after the SC-FDMA symbol is generated.

The OCC used for the DMRS is determined by using the cyclic shift information included in the uplink grant. A shift amount of the cyclic shift used for the DMRS is determined from the cyclic shift information included in the uplink grant, a parameter specific to the base station apparatus broadcasted from the base station apparatus, and a random number determined by using a Physical Cell ID assigned to a cell managed by the base station apparatus from a network and the like as an input.

The PUCCH is a physical channel used for transmitting Uplink Control Information (UCI) which is information used for control of communication such as Channel Quality Information indicating a channel quality of a downlink, a Scheduling Request (SR) indicating a request for assignment of a radio resource of the uplink, ACK/NACK indicating success/failure of decoding of the downlink data received by the mobile station apparatus 1 and the like.

The PUSCH is a physical channel used for transmitting the uplink data and uplink control information. The PRACH is a physical channel used for transmitting a random access preamble. The PRACH has the most important object of synchronizing the mobile station apparatus 1 with the base station apparatus 3 in the time domain and in addition is also used for an initial access, handover, a request for reconnection, and a request for assignment of a radio resource of the uplink.

The random access of the present invention will be described below.

The random access has two access methods, that is, a Contention based Random Access and a Non-contention based Random Access. The Contention based Random Access is an access method with a possibility of collision between the mobile station apparatuses 1 and is a random access usually performed. The Non-contention based Random Access is an access method in which no collision occurs between the mobile station apparatuses 1 and is a random access performed under the initiative of the base station apparatus 3 in a special case such as handover in order to rapidly synchronize the mobile station apparatus 1 with the base station apparatus 3.

In the random access, the mobile station apparatus 1 transmits only the preamble for synchronization. The preamble includes a signature which is a signal pattern expressing information and can express information with several bits by preparing tens of types of signatures. The mobile station apparatus 1 transmits information of 6 bits by using the preamble, and thus 64 types of signatures are prepared.

The base station apparatus 3, when receiving the preamble transmitted from the mobile station apparatus 1, calculates a difference in synchronization timing between the mobile station apparatus 1 and the base station apparatus 3 from the preamble and performs scheduling for the mobile station apparatus 1 to transmit the message 3. Then, the base station apparatus 3 assigns a T C-RNTI to the mobile station apparatus 1 which transmitted the preamble, includes and arranges an RA-RNTI (Random Access-Radio Network Temporary Identifier) corresponding to the PRACH which received the preamble in the PDCCH and transmits a random access response (message 2) including difference information for the synchronization timing, scheduling information, the T C-RNTI and a number of the signature of the received preamble (also referred to as a random ID or a preamble ID) in the PDSCH indicated by the radio resource assignment included in this PDCCH.

If it is confirmed that the RA-RNTI is included in the detected PDCCH, the mobile station apparatus 1 confirms the contents of the random access response arranged in the PDSCH indicated by the radio resource assignment included in the PDCCH. The mobile station apparatus 1 extracts a response including the number of signature of the preamble transmitted by its own apparatus, corrects the difference in the synchronization timing and transmits, by the radio resource of the assigned PUSCH and the transmission format, the message 3 including the C-RNTI notified from the base station apparatus 3 in advance or a message requesting connection (RRC Connection Request message) or a message requesting connection resetting (RRC Connection Reestablishment Request message).

The base station apparatus 3, when having received the message 3 from the mobile station apparatus 1, transmits, to the mobile station apparatus 1, a contention resolution (message 4) for determining if a collision is occurring or not between the mobile station apparatuses 1 by using the C-RNTI or information for identifying the mobile station apparatus 1 and included in the message requesting connection or the message requesting connection resetting included in the received message 3. The base station apparatus 3, when failed in decoding of the message 3, instructs the mobile station apparatus 1 to retransmit the message 3 by using the DCI format 0 including the T C-RNTI corresponding to the message 3 failed in decoding.

The uplink data (UL-SCH) and the downlink data (DL-SCH) and the like are transport channels. The unit in which the uplink data is transmitted by the PUSCH and the unit in which the downlink data is transmitted by the PDSCH are referred to as transport blocks. The transport block is a unit handled by a MAC (Media Access Control) layer, and HARQ (retransmission) control is executed for each transport block.

In a physical layer, the transport block is associated with a code word, and signal processing such as encoding is executed for each code word. The transport block size is the number of bits of the transport block. The mobile station apparatus 1 recognizes the transport block size on the basis of the number of Physical Resource Blocks (PRB) and MCS (MCS&RV) indicated by information indicating the radio resource assignment included in the uplink grant or the downlink assignment.

A configuration of a radio frame of the present invention will be described below.

Figure 12:
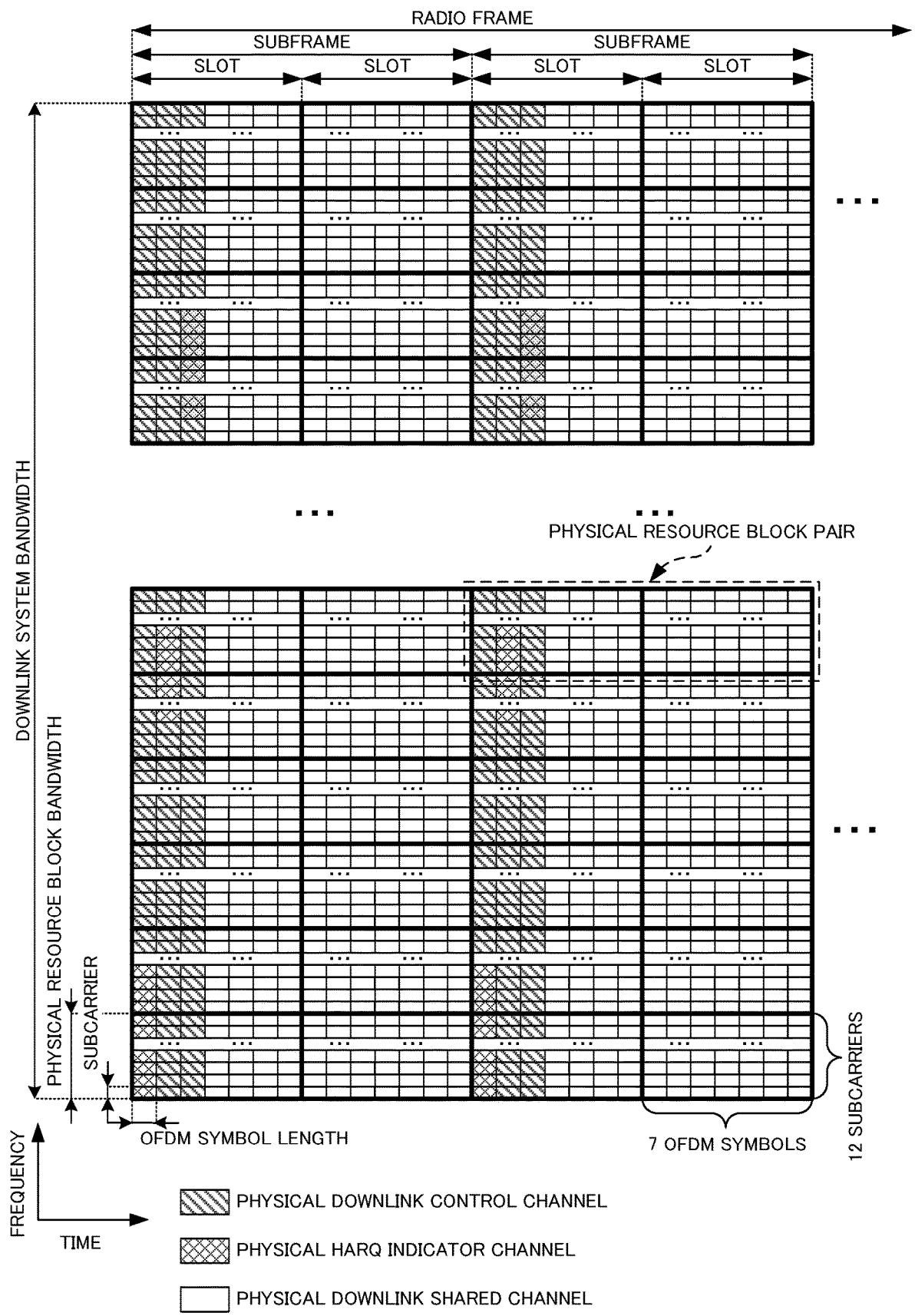
FIG. 12 is a schematic diagram illustrating an example of a configuration of a radio frame of a downlink in an embodiment of the present invention.

FIG. 12 is a schematic diagram illustrating an example of a configuration of the radio frame of the downlink in an embodiment of the present invention. In FIG. 12, the horizontal axis indicates the time domain and the vertical axis indicates the frequency domain. As illustrated in FIG. 12, the radio frame of the downlink includes a plurality of downlink physical resource block (PRB) pairs (a region surrounded by a broken line in FIG. 12, for example). This downlink physical resource block pair is a unit for assignment of the radio resource and the like and includes a frequency band having a width determined in advance (PRB bandwidth; 180 kHz) and a time zone (2 slots=1 subframe; 1 ms).

One downlink physical resource block pair includes two downlink physical resource blocks (PRB bandwidth×slot) contiguous in the time domain. One downlink physical resource block (a unit surrounded by a bold line in FIG. 12) includes 12 subcarriers (15 kHz) in the frequency domain and 7 OFDM (Orthogonal Frequency Division Multiplexing) symbols (71 μs) in the time domain.

In the time domain, there are a slot (0.5 ms) composed of 7 OFDM symbols (71 μs), a subframe (1 ms) composed of 2 slots, and a radio frame (10 ms) composed of 10 subframes. The time interval of 1 ms which is the same as the subframe is also referred to as a transmit time interval (TTI). In the frequency domain, a plurality of the downlink physical resource blocks is arranged in accordance with the bandwidth of the downlink. A unit composed of one subcarrier and one OFDM symbol is referred to as a downlink resource element.

Arrangement of the physical channel assigned to the downlink will be described below. In each subframe of the downlink, the PDCCH, the PCFICH, the PHICH, the PDSCH, the downlink reference signal and the like are arranged. The PDCCH is arranged from the first OFDM symbol in the subframe (a hatched region in FIG. 12). The number of OFDM symbols in which the PDCCH is arranged is different for each subframe, and information indicating the number of OFDM symbols in each of which the PDCCH is arranged is broadcasted by the PCFICH. In each subframe, a plurality of PDCCHs is frequency-multiplexed and time-multiplexed.

The PCFICH is arranged in the first OFDM symbol on the subframe and is frequency-multiplexed with the PDCCH. The PHICH is frequency-multiplexed with the PDCCH in the same OFDM symbol (a hatched region with reticulated lines in FIG. 12). The PHICH may be arranged only in the first OFDM symbol on the subframe or may be arranged in a distributed manner in a plurality of the OFDM symbols in each of which the PDCCH is arranged. In each subframe, a plurality of PHICHs is frequency-multiplexed and code-multiplexed.

After a predetermined time from the transmission of the PUSCH (4 ms later, 4 subframes later or 4 TTIs later, for example), the mobile station apparatus 1 receives HARQ feedback for this PUSCH in the PHICH on the subframe of the downlink. In which PHICH on the subframe of the downlink the HARQ indicator for the PUSCH is arranged is determined based on a number of the physical resource block with the smallest number (in the lowest frequency domain) in the physical resource blocks assigned to this PUSCH and based on information included in the uplink grant and used for determining the cyclic shift used for the uplink reference signal which is time-multiplexed with the PUSCH.

The PDSCH is arranged in the OFDM symbol (a non-hatched region in FIG. 12) other than the OFDM symbols in which the PDCCH, the PCFICH, and the PHICH are arranged in the subframe. The radio resource of the PDSCH is assigned by using the downlink assignment. The radio resources of the PDSCH and the PDCCH including the downlink assignment used for this assignment of the PDSCH in the time domain are arranged in the same subframe of the downlink. In each subframe, a plurality of the PDSCHs is frequency-multiplexed and space-multiplexed. Though the downlink reference signal is not shown in FIG. 12 for simplification of explanation, the downlink reference signal is arranged in a distributed manner in the frequency domain and the time domain.

Figure 13:
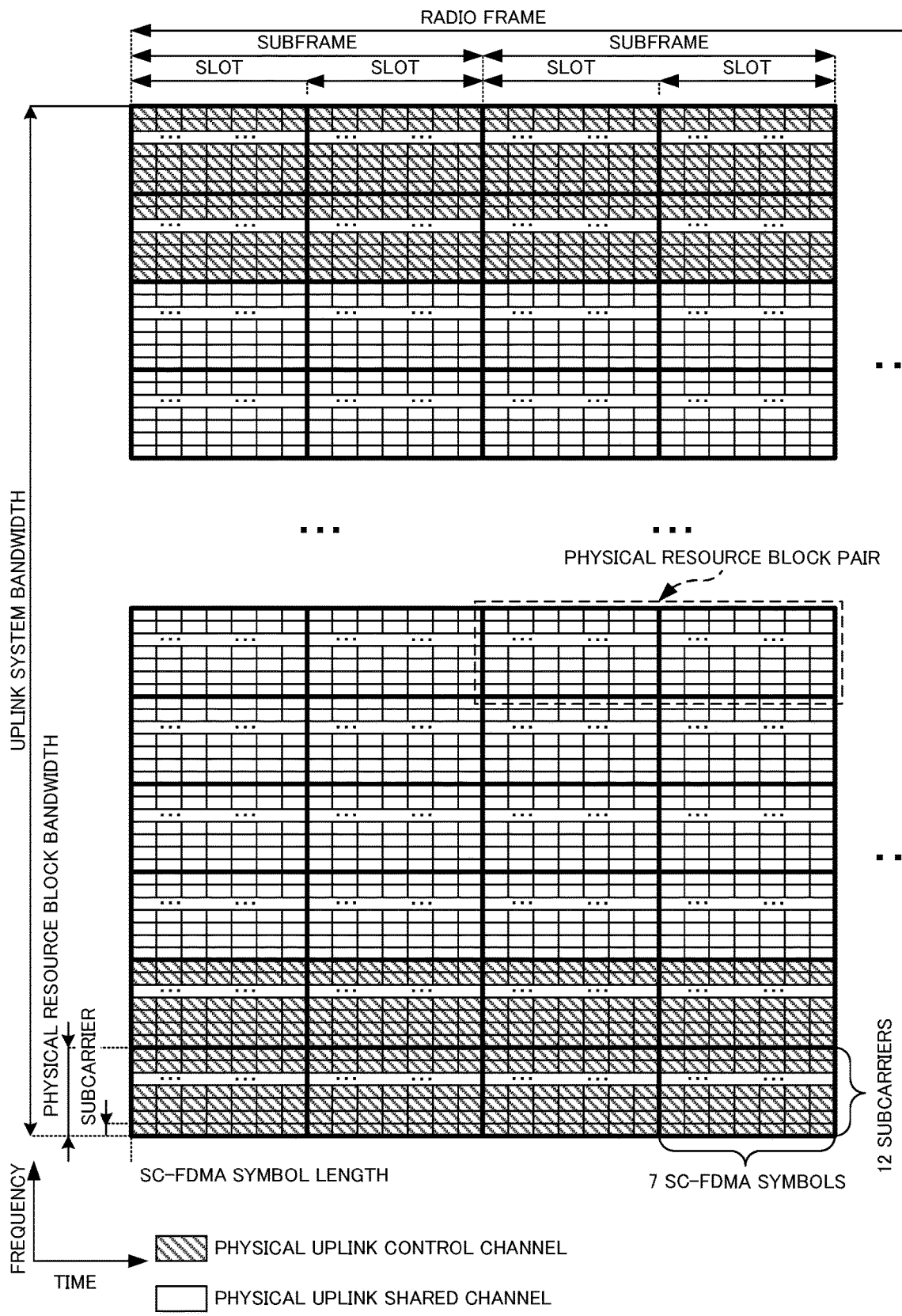
FIG. 13 is a schematic diagram illustrating an example of a configuration of a radio frame of an uplink in an embodiment of the present invention.

FIG. 13 is a schematic diagram illustrating an example of a configuration of the radio frame of the uplink in an embodiment of the present invention. In FIG. 13, the horizontal axis indicates the time domain, and the vertical axis indicates the frequency domain. As illustrated in FIG. 13, the uplink radio frame includes a plurality of uplink physical resource block pairs (a region surrounded by a broken line in FIG. 13, for example). This uplink physical resource block pair is a unit for assignment of the radio resource and the like and includes a frequency band having a width determined in advance (PRB bandwidth; 180 kHz) and a time zone (2 slots=1 subframe; 1 ms).

One uplink physical resource block pair includes two uplink physical resource blocks (PRB bandwidth×slot) contiguous in the time domain. One uplink physical resource block (unit surrounded by a bold line in FIG. 13) includes 12 subcarriers (15 kHz) in the frequency domain and 7 SC-FDMA symbols (71 µs) in the time domain.

In the time domain, there are a slot (0.5 ms) composed of 7 SC-FDMA (Single-Carrier Frequency Division Multiple Access) symbols (71 µs), a subframe (1 ms) composed of two slots, and a radio frame (10 ms) composed of 10 subframes. The time interval 1 ms which is the same as that of the subframe is also referred to as a Transmit Time Interval (TTI). In the frequency domain, a plurality of uplink physical resource blocks is arranged in accordance with the bandwidth of the uplink. A unit composed of one subcarrier and one SC-FDMA symbol is referred to as an uplink resource element.

The physical channel assigned in the uplink radio frame will be described below. The PUCCH, PUCSH, PRACH, the uplink reference signal and the like are arranged in each subframe of the uplink. The PUCCH is arranged in the uplink physical resource block (a diagonally hatched region) at the both ends of the uplink band. In each subframe, a plurality of the PUCCHs is frequency-multiplexed and code-multiplexed.

The PUSCH is arranged in the uplink physical resource block pair (a non-hatched region) other than the uplink physical resource block in which the PUCCH is arranged. The radio resource for the PUSCH is assigned by using the uplink grant and arranged in an uplink subframe after a predetermined time (4 ms after, 4 subframes after or 4 TTIs after, for example) from the downlink subframe in which the PDCCH including this uplink grant is arranged. In each subframe, a plurality of the PUSCHs is frequency-multiplexed and spatially-multiplexed.

Information indicating the subframe and the uplink physical resource block in which the PRACH is arranged is broadcasted by the base station apparatus. The uplink reference signal is time-multiplexed with the PUCCH or the PUSCH. For example, the DMRS time-multiplexed with the PUSCH is arranged in the fourth and eleventh SC-FDMA symbols in the subframe.

An apparatus configuration of the present invention will be described below.

Figure 1:
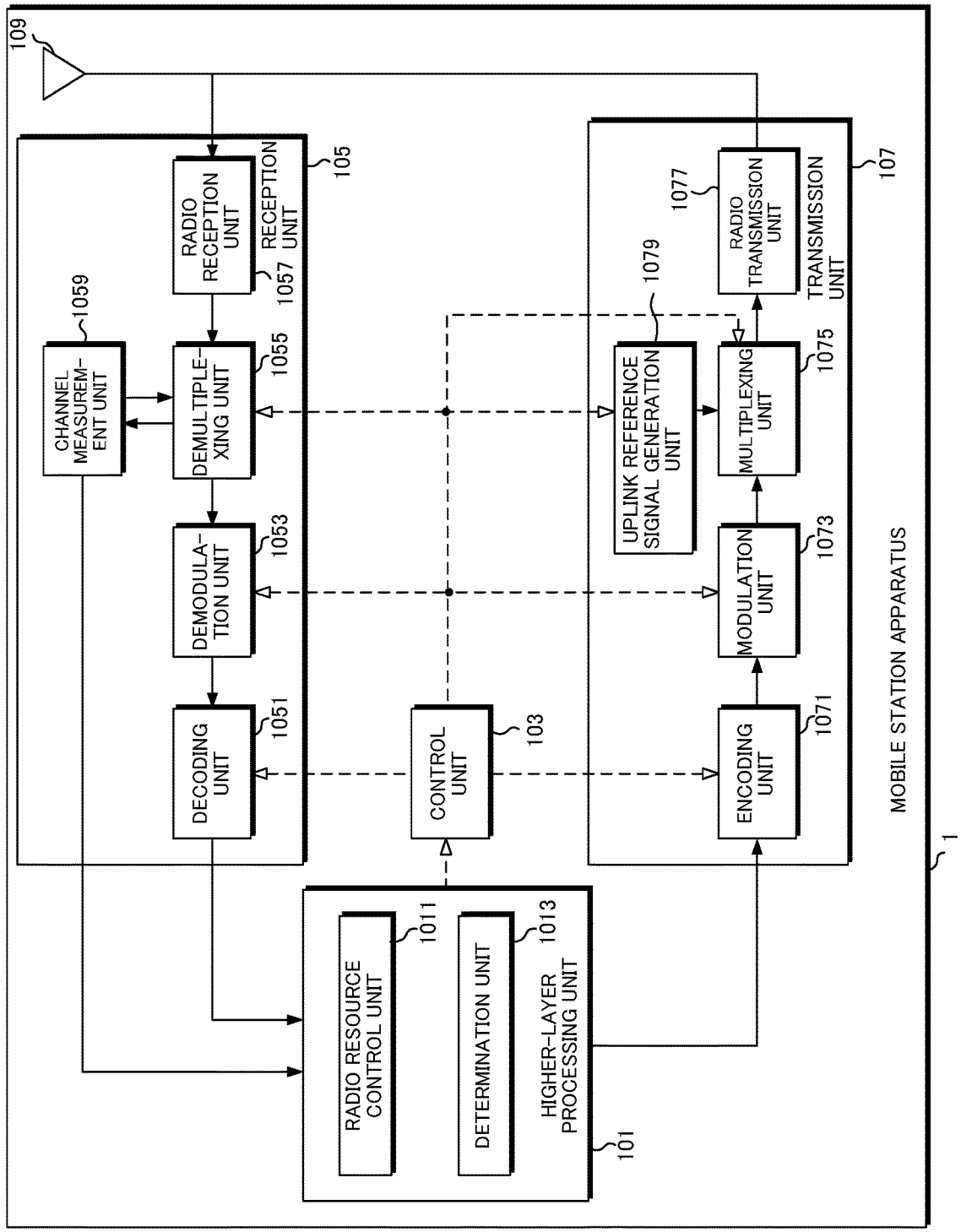
FIG. 1 is a schematic block diagram illustrating a configuration of a mobile station apparatus 1 of an embodiment of the present invention.

FIG. 1 is a schematic block diagram illustrating a configuration of a mobile station apparatus 1 of an embodiment of the present invention. As illustrated in the figure, the mobile station apparatus 1 includes a higher-layer processing unit 101, a control unit 103, a reception unit 105, a transmission unit 107, and a transmission/reception antenna 109. The higher-layer processing unit 101 includes a radio resource control unit 1011 and a determination unit 1013. The reception unit 105 includes a decoding unit 1051, a demodulation unit 1053, a demultiplexing unit 1055, a radio reception unit 1057, and a channel measurement unit 1059. The transmission unit 107 includes an encoding unit 1071, a modulation unit 1073, a multiplexing unit 1075, a radio transmission unit 1077, and an uplink reference signal generation unit 1079.

The higher-layer processing unit 101 outputs uplink data generated by an operation of a user and the like to the transmission unit 107. Moreover, the higher-layer processing unit 101 performs processing of a Medium Access Control (MAC) layer, a Packet Data Convergence Protocol (PDCP) layer, a Radio Link Control (RLC) layer and a Radio Resource Control (RRC) layer. Moreover, the higher-layer processing unit 101 generates control information for control of the reception unit 105 and the transmission unit 107 on the basis of the downlink control information received by the PDCCH and the like and outputs the control information to the control unit 103.

The radio resource control unit 1011 provided in the higher-layer processing unit 101 manages various setting information of its own apparatus. For example, the radio resource control unit 1011 manages an RNTI such as a C-RNTI and an uplink transmission mode which will be described later. Moreover, the radio resource control unit 1011 generates information arranged in each channel of the uplink and outputs the information to the transmission unit 107.

The determination unit 1013 provided in the higher-layer processing unit 101 determines whether or not the cyclic shift information included in the uplink grant corresponds to the OCC applied to the DMRS by using the uplink transmission mode, the RNTI and the like managed by the radio resource control unit 1011. Moreover, the determination unit 1013 determines the cyclic shift and the OCC applied to the DMRS in accordance with the cyclic shift information on the basis of the determination result, generates control information for the transmission unit 107 to apply the determined cyclic shift and OCC to the DMRS and outputs the control information to the control unit 103.

The control unit 103 generates a control signal for controlling the reception unit 105 and the transmission unit 107 on the basis of the control information from the higher-layer processing unit 101. The control unit 103 outputs the generated control signal to the reception unit 105 and the transmission unit 107 and controls the reception unit 105 and the transmission unit 107. The reception unit 105 separates, demodulates, and decodes the received signal received from the base station apparatus 3 via the transmission/reception antenna 109 in accordance with the control signal input from the control unit 103 and outputs the decoded information to the higher-layer processing unit 101.

The radio reception unit 1057 converts the downlink signal received via the transmission/reception antenna 109 to an intermediate frequency (down convert), removes an unnecessary frequency component, controls an amplification level so that the signal level is maintained appropriately, orthogonally demodulates the signal on the basis of an in-phase component and an orthogonal component of the received signal and converts the orthogonally-demodulated analog signal to a digital signal. The radio reception unit 1057 removes a portion corresponding to a Guard Interval (GI) from the converted digital signal, performs Fast Fourier Transform (FFT) on the signal from which the GI has been removed, and extracts a signal of the frequency domain.

The demultiplexing unit 1055 separates the extracted signal to the PHICH, the PDCCH, the PDSCH, and the downlink reference signal, respectively. This separation is made on the basis of assignment information of a radio resource notified by the downlink assignment and the like. Moreover, the demultiplexing unit 1055 compensates for the channels of the PHICH, PDCCH, and PDSCH on the basis of estimation values of the channels input from the channel measurement unit 1059. Moreover, the demultiplexing unit 1055 outputs the separated downlink reference signal to the channel measurement unit 1059.

The demodulation unit 1053 multiplies and synthesizes a corresponding code to the PHICH, demodulates the synthesized signal in the Binary Phase Shift Keying (BPSK) modulation scheme, and outputs the result to the decoding unit 1051. The decoding unit 1051 decodes the PHICH addressed to its own apparatus and outputs a decoded HARQ indicator to the higher-layer processing unit 101. The demodulation unit 1053 demodulates the PDCCH in a QPSK demodulation scheme and outputs the result to the decoding unit 1051. The decoding unit 1051 tries blind decoding of the PDCCH and if the blind decoding is successful, outputs the decoded downlink control information and the RNTI included in the downlink control information to the higher-layer processing unit 101.

The demodulation unit 1053 demodulates the PDSCH in a modulation scheme notified in the downlink assignment such as Quadrature Phase Shift keying (QPSK), 16QAM (Quadrature Amplitude Modulation), 64 QAM and the like and outputs the result to the decoding unit 1051. The decoding unit 1051 decodes the result on the basis of the information relating to the coding rate notified in the downlink control information and outputs the decoded downlink data (transport block) to the higher-layer processing unit 101.

The channel measurement unit 1059 measures a path loss and a channel state of the downlink from the downlink reference signal input from the demultiplexing unit 1055 and outputs the measured path loss and channel state to the higher-layer processing unit 101. Moreover, the channel measurement unit 1059 calculates an estimation value of the downlink channel from the downlink reference signal and outputs the result to the demultiplexing unit 1055.

The transmission unit 107 generates an uplink reference signal in accordance with the control signal input form the control unit 103, encodes and modulates the uplink data (transport block) input from the higher-layer processing unit 101, multiplexes the PUCCH, PUSCH, and the generated uplink reference signal, and transmits the result to the base station apparatus 3 via the transmission/reception antenna 109. The encoding unit 1071 performs coding on the uplink control information input from the higher-layer processing unit 101 such as convolutional coding, block coding and the like and performs turbo coding on the uplink data on the basis of the information relating to coding rate notified in the uplink grant.

The modulation unit 1073 modulates the coding bit input from the encoding unit 1071 in a modulation scheme notified in the downlink control information such as BPSK, QPSK, 16QAM, 64QAM and the like or a modulation scheme determined in advance for each channel. The modulation unit 1073 maps sequences of modulation symbols of the plurality of pieces of uplink data transmitted by the same PUSCH by using the MIMO SM onto a plurality of sequences larger in number than the number of the pieces of the uplink data transmitted by the same PUSCH and performs precoding on these sequences on the basis of the number of sequences notified in the uplink grant and spatially multiplexed and the information indicating precoding to these sequences.

The uplink reference signal generation unit 1079 generates a sequence known to the base station apparatus 3 and acquired in compliance with a rule determined in advance on the basis of a physical cell identifier (referred to as PCI, Cell ID and the like) for identifying the base station apparatus 3, a bandwidth in which the uplink reference signal is arranged, a cyclic shift notified in the uplink grant and the like. The multiplexing unit 1075 rearranges modulation symbols of the PUSCH to parallel in accordance with the control signal input from the control unit 103 and then, performs Discrete Fourier Transform (DFT) thereon and multiplexes the PUCCH and PUSCH signals with the generated uplink reference signal for each transmission antenna port.

The radio transmission unit 1077 performs Inverse Fast Fourier Transform (IFFT) on the multiplexed signal for modulation in the SC-FDMA system, adds the guard interval to the SC-FDMA modulated SC-FDMA symbol, generates a baseband digital signal, converts the baseband digital signal to an analog signal, generates an in-phase component and an orthogonal component of the intermediate frequency from the analog signal, removes an excess frequency component with respect to the intermediate frequency band, converts the signal with the intermediate frequency to a signal with a high frequency (up convert), removes an excess frequency component, amplifies power, and outputs the result to the transmission/reception antenna 109 for transmission.

Figure 2:
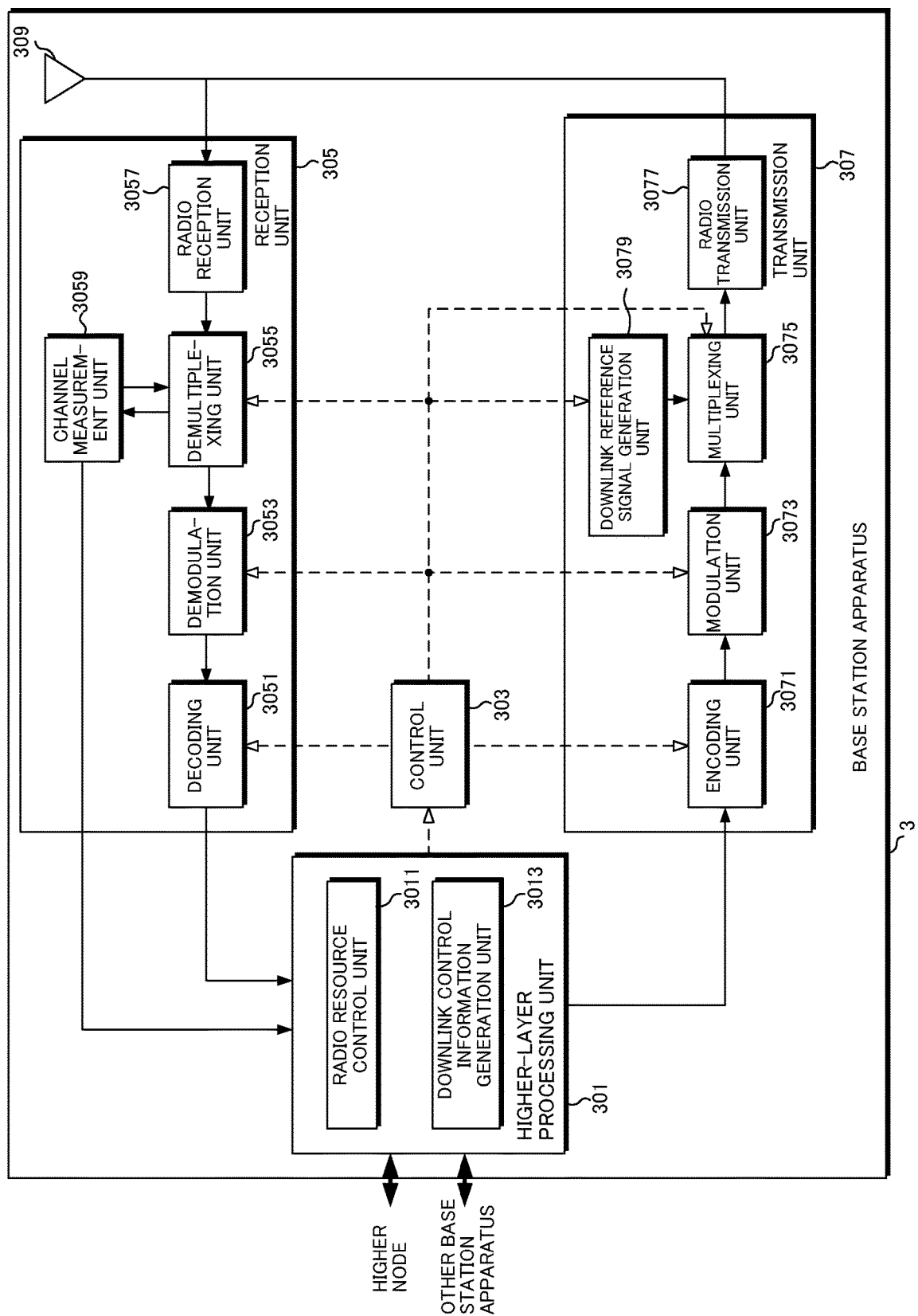
FIG. 2 is a schematic block diagram illustrating a configuration of a base station apparatus 3 of an embodiment of the present invention.

FIG. 2 is a schematic block diagram illustrating a configuration of the base station apparatus 3 of an embodiment of the present invention. As illustrated in the figure, the base station apparatus 3 includes a higher-layer processing unit 301, a control unit 303, a reception unit 305, a transmission unit 307, and a transmission/reception antenna 309. The higher-layer processing unit 301 includes a radio resource control unit 3011 and a downlink control information generation unit 3013. The reception unit 305 includes a decoding unit 3051, a demodulation unit 3053, a demultiplexing unit 3055, a radio reception unit 3057, and a channel measurement unit 3059. The transmission unit 307 includes an encoding unit 3071, a modulation unit 3073, a multiplexing unit 3075, a radio transmission unit 3077, and a downlink reference signal generation unit 3079.

The higher-layer processing unit 301 performs processing of a Medium Access Control (MAC) layer, a Packet Data Convergence Protocol (PDCP) layer, a Radio Link Control (RLC) layer and a Radio Resource Control (RRC) layer. Moreover, the higher-layer processing unit 301 generates control information for control of the reception unit 305 and the transmission unit 307 and outputs the control information to the control unit 303.

The radio resource control unit 3011 provided in the higher-layer processing unit 301 generates or obtains from a higher node, downlink data (transport block), an RRC signal, and an MAC CE (Control Element) arranged in the downlink PDSCH and outputs them to the transmission unit 307. Moreover, the radio resource control unit 3011 manages various types of setting information of each of the mobile station apparatuses 1. For example, the radio resource control unit 3011 performs management of the RNTI such as assignment of a C-RNTI to the mobile station apparatus 1 and of an uplink transmission mode set for the mobile station apparatus 1.

The downlink control information generation unit 3013 provided in the higher-layer processing unit 301 generates downlink control information transmitted by the PDCCH. The downlink control information generation unit 3013 generates an uplink grant including the cyclic shift information corresponding to the OCC used for the DMRS and the uplink grant including the cyclic shift information not corresponding to the OCC used for the DMRS.

The downlink control information generation unit 3013 determines which uplink grant is to be generated in accordance with the uplink transmission mode set for the mobile station apparatus 1 managed by the radio resource control unit 3011, whether the uplink grant indicates a permanent radio resource of the PUSCH or the radio resource of the PUSCH only for one subframe, whether the uplink grant indicates retransmission of the message 3 and the like.

The control unit 303 generates a control signal for controlling the reception unit 305 and the transmission unit 307 on the basis of the control information from the higher-layer processing unit 301. The control unit 303 outputs the generated control signals to the reception unit 305 and the transmission unit 307 and controls the reception unit 305 and the transmission unit 307.

The reception unit 305 separates, demodulates, and decodes a received signal received from the mobile station apparatus 1 via the transmission/reception antenna 309 in accordance with the control signal input from the control unit 303 and outputs the decoded information to the higher-layer processing unit 301. The radio reception unit 3057 converts the uplink signal received via the transmission/reception antenna 309 to an intermediate frequency (down convert), removes an unnecessary frequency component, controls an amplification level so that the signal level is maintained appropriately, orthogonally demodulates the signal on the basis of an in-phase component and an orthogonal component of the received signal and converts the orthogonally-demodulated analog signal to a digital signal.

The radio reception unit 3057 removes a portion corresponding to a guard interval (GI) from the converted digital signal. The radio reception unit 3057 performs Fast Fourier Transform (FFT) on the signal from which the GI has been removed, extracts a signal of the frequency domain, and outputs the result to the demultiplexing unit 3055.

The demultiplexing unit 3055 separates the signal input from the radio reception unit 3057 to the PUCCH, the PUSCH, a signal such as an uplink reference signal and the like. This separation is performed on the basis of assignment information of a radio resource included in the uplink grant determined by the base station apparatus 3 in advance in the radio resource control unit 3011 and notified to each mobile station apparatus 1. Moreover, the demultiplexing unit 3055 compensates for the channels of the PUCCH and PUSCH from estimation values of the channels input from the channel measurement unit 3059. Moreover, the demultiplexing unit 3055 outputs the separated uplink reference signal to the channel measurement unit 3059.

The demodulation unit 3053 performs Inverse Discrete Fourier Transform (IDFT) on the PUSCH, obtains a modulation symbol, and demodulates a received signal for each of the modulation symbols of the PUCCH and the PUSCH using a modulation scheme determined in advance such as BPSK (Binary Phase Shift Keying), QPSK, 16QAM, 64QAM and the like or notified by its own apparatus in advance in the uplink grant for each of the mobile station apparatuses 1. The demodulation unit 3053 separates the modulation symbols of a plurality of pieces of the uplink data transmitted by the same PUSCH by using the MIMO SM on the basis of the number of sequences to be spatially multiplexed which is notified in advance in the uplink grant for each of the mobile station apparatuses 1 and information indicating precoding performed on the sequences.

The decoding unit 3051 decodes coding bits of the demodulated PUCCH and PUSCH with a coding rate determined in advance or notified in advance in the uplink grant by its own apparatus to the mobile station apparatus 1 in the coding method determined in advance and outputs the decoded uplink data and the uplink control information to the higher-layer processing unit 301. In the case of retransmission of the PUSCH, the decoding unit 3051 performs decoding by using the coding bit held in a HARQ buffer input from the higher-layer processing unit 301 and the demodulated coding bit. The channel measurement unit 3059 measures estimation values, a channel quality and the like of the channel from the uplink reference signal input from the demultiplexing unit 3055 and outputs the result to the demultiplexing unit 3055 and the higher-layer processing unit 301.

The transmission unit 307 generates a downlink reference signal in accordance with the control signal input from the control unit 303, encodes and modulates the HARQ indicator, downlink control information, and the downlink data input from the higher-layer processing unit 301, multiplexes the PHICH, PDCCH, PDSCH, and the downlink reference signal, and transmits the result to the mobile station apparatus 1 via the transmission/reception antenna 309.

The encoding unit 3071 performs coding on the HARQ indicator, the downlink control information, and the downlink data input from the higher-layer processing unit 301 by using a coding method determined in advance such as block coding, convolutional coding, turbo coding and the like or performs coding by using a coding method determined by the radio resource control unit 3011. The modulation unit 3073 modulates the coding bits input from the encoding unit 3071 by a modulation scheme determined in advance such as BPSK, QPSK, 16QAM, 64QAM and the like or determined by the radio resource control unit 3011.

The downlink reference signal generation unit 3079 generates a sequence known to the mobile station apparatus 1, as a downlink reference signal, acquired in compliance with a rule determined in advance on the basis of the physical cell identifier (PCI) for identifying the base station apparatus 3 and the like. The multiplexing unit 3075 multiplexes the generated downlink reference signal with the modulated modulation symbol of each channel.

The radio transmission unit 3077 performs Inverse Fast Fourier Transform (IFFT) on the multiplexed modulation symbol and the like for performing modulation in the OFDM system, adds the guard interval to the OFDM-modulated OFDM symbol, generates a baseband digital signal, converts the baseband digital signal to an analog signal, generates an in-phase component and an orthogonal component of the intermediate frequency from the analog signal, removes an excess frequency component with respect to the intermediate frequency band, converts the signal with the intermediate frequency to a signal with a high frequency (up convert), removes an excess frequency component, amplifies power, and outputs the result to the transmission/reception antenna 309 for transmission.

Figure 3:
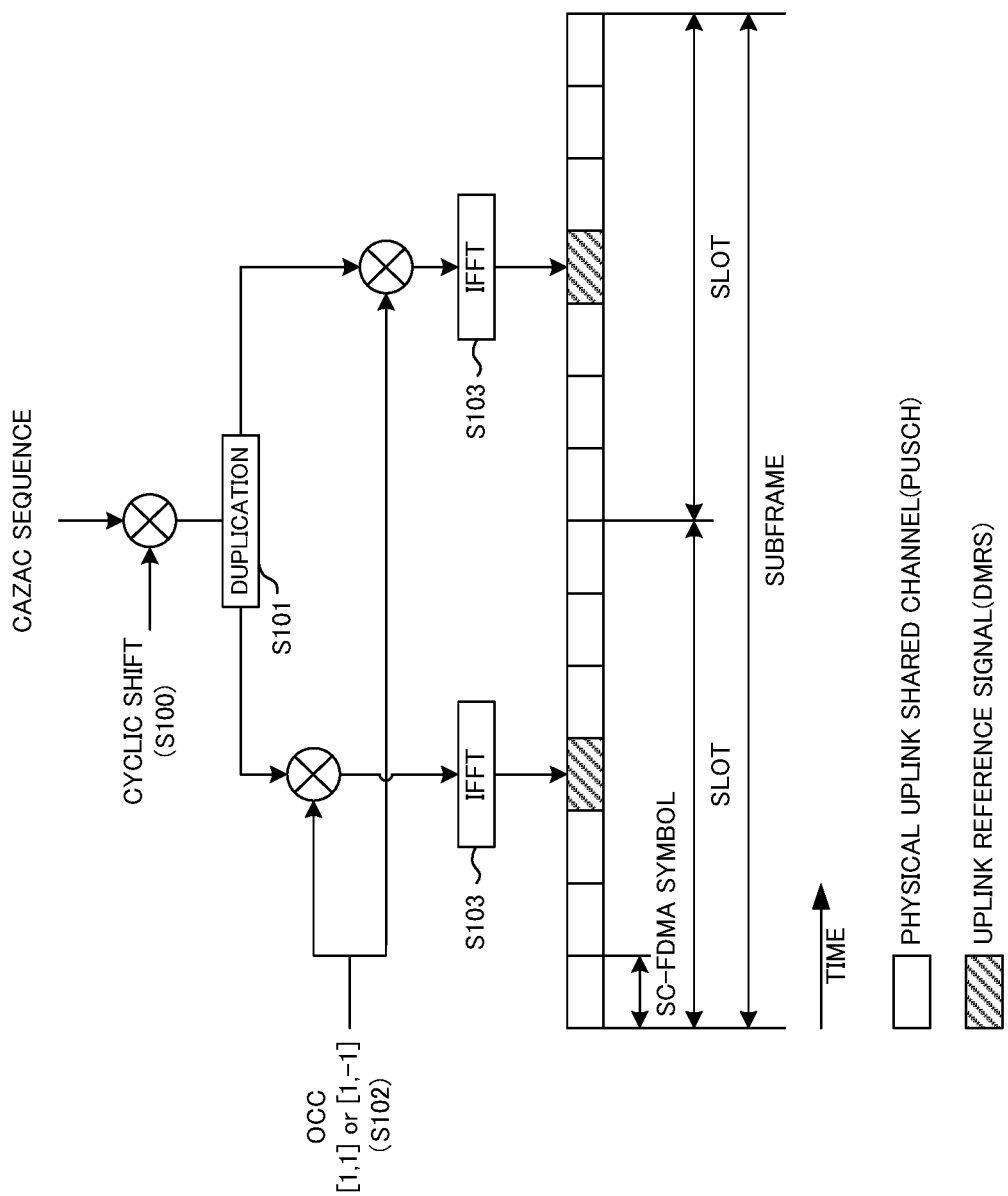
FIG. 3 is a schematic diagram for explaining a generating method of DMRS in an embodiment of the present invention.

FIG. 3 is a schematic diagram for explaining a generating method of the DMRS in an embodiment of the present invention. In FIG. 3, the horizontal axis is the time domain. First, a cyclic shift is applied to the CAZAC sequence generated by the mobile station apparatus 1 (Step S100). Subsequently, the CAZAC sequence to which the cyclic shift was applied is duplicated into two (Step S101) and multiplied by OCC (Step S102).

Subsequently, the CAZAC sequence multiplied by the OCC is mapped onto the physical resource block to which the PUSCH is assigned, Inverse Fast Fourier Transform (IFFT) is executed, and an SC-FDMA symbol is generated (Step S103). The generated SC-FDMA symbol is mapped as fourth and eleventh SC-FDMA symbols in the subframe. Multiplication of the OCC at [1, 1] corresponds to non-application of the OCC to the DMRS (Step S102 is omitted). Moreover, non-application of the OCC (Step S102 is omitted) corresponds to multiplication of the OCC at [1, 1].

A search space of the present invention will be described below.

Figure 4:
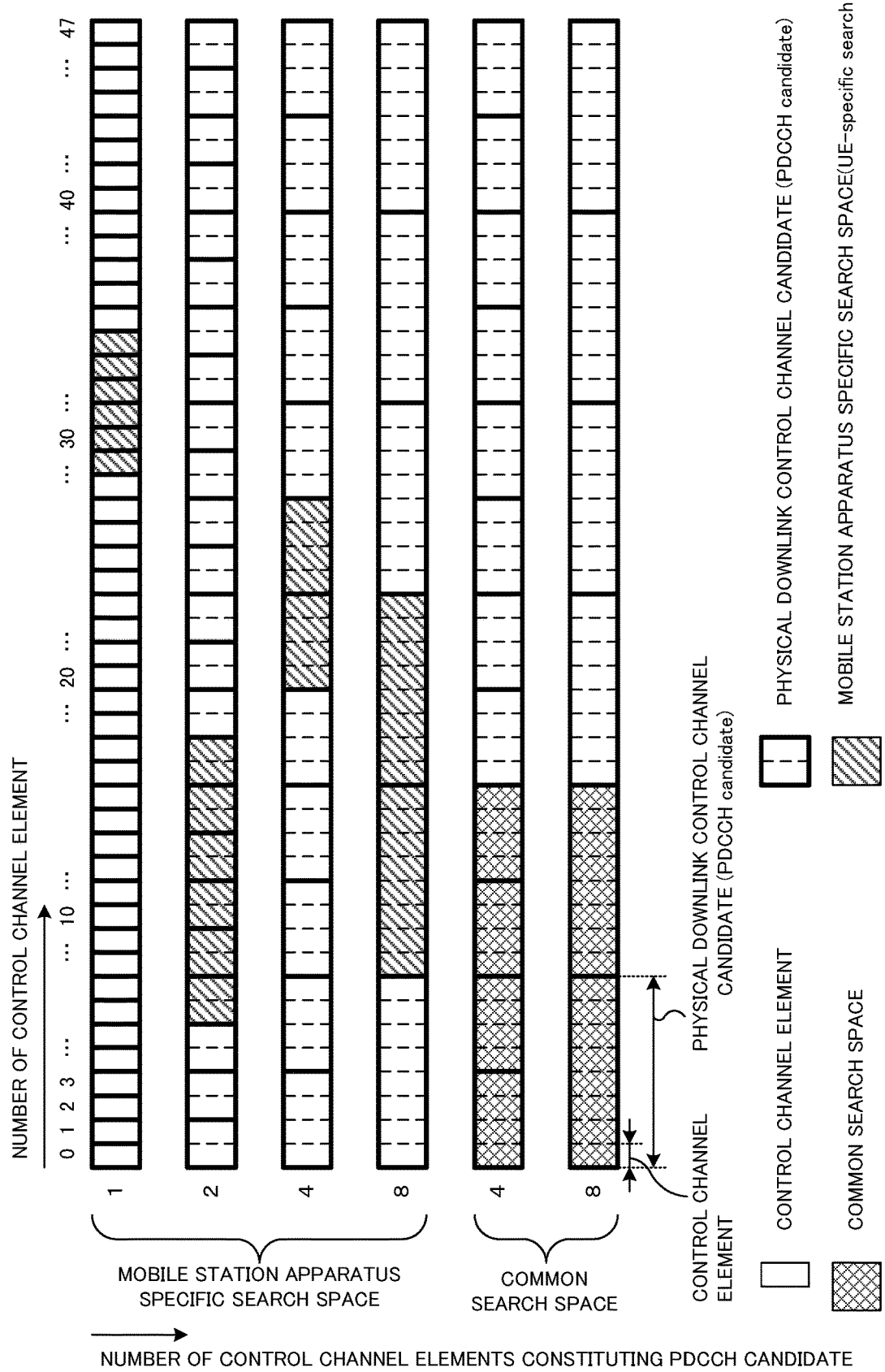
FIG. 4 is a schematic diagram illustrating an example of a configuration of a search space in which PDCCH is arranged in an embodiment of the present invention.

FIG. 4 is a schematic diagram illustrating an example of a configuration of the search space in which the PDCCH of is arranged in an embodiment of the present invention. In FIG. 4, the horizontal axis indicates a number identifying a Control Channel Element (CCE). In FIG. 4, a unit surrounded by a bold line in FIG. 4 is a candidate in which the PDCCH is to be arranged (hereinafter referred to as "PDCCH candidate") composed of a plurality of continuously-numbered control channel elements. The PDCCH candidate diagonally hatched in FIG. 4 is a PDCCH candidate in a mobile station apparatus specific search space (UE-specific Search Space: USS). The PDCCH candidate hatched in a reticulated state in FIG. 4 is a PDCCH candidate in a Common Search Space (CSS).

The common search space is a space common among a plurality of the mobile station apparatuses 1 and is a space in which the PDCCH to a plurality of mobile station apparatuses 1 and/or the PDCCH to a specific mobile station apparatus 1 are/is arranged. The mobile station apparatus specific search space is a space in which the PDCCH to the specific mobile station apparatus 1 is arranged and is a space configured for each mobile station apparatus 1.

The search space is a set of the PDCCH candidates. The PDCCH candidate is composed of a plurality of Control Channel Elements (CCE). One control channel element is composed of a plurality of resource elements dispersed in a frequency domain and a time domain within the OFDM symbol in which the PDCCH in the same subframe is arranged.

Regarding the search space, a different search space is configured for each number of the control channel elements constituting the PDCCH candidate. In FIG. 4, different common search spaces are configured for the PDCCH candidate constituted by four control channel elements and the PDCCH candidate constituted by eight control channel elements. Regarding the mobile station apparatus specific search space, different mobile station apparatus specific search spaces are configured for the PDCCH candidate constituted by one control channel element, the PDCCH candidate constituted by two control channel elements, the PDCCH candidate constituted by four control channel elements, and the PDCCH candidate constituted by eight channel elements.

The common search space is configured by zeroth to fifteenth control channel elements. The number of PDCCH candidates and the number of control channel elements constituting the mobile station apparatus specific search space are determined in advance, and the number of the control channel element constituting the mobile station apparatus specific search space is determined by hushing function using the C-RNTI assigned by the base station apparatus 3 to the mobile station apparatus 1 as an input. Moreover, the mobile station apparatus specific search space is constituted by control channel elements different for each subframe.

A part of or the whole of the different mobile station apparatus specific search spaces may be duplicated for the different mobile station apparatus 1. The plurality of mobile station apparatus specific search spaces and the plurality of common search spaces constituted by the different numbers of the control channel elements for the same mobile station apparatus 1 may be constituted by the same control channel element or may be constituted by the different control channel elements. That is, a part of or the whole of the PDCCH candidates constituting the different plurality of search spaces may be duplicated.

An uplink transmission mode of the present invention will be described below.

FIG. 5 is a diagram illustrating a relationship between the uplink grant and the OCC applied to the DMRS in an embodiment of the present invention. The mobile station apparatus 1 of the present invention includes a mode 1 not using the OCC for the DMRS time-multiplexed with the PUSCH and a mode 2 using the OCC for the DMRS time-multiplexed with the PUSCH as the uplink transmission mode. The uplink transmission mode of the mobile station apparatus 1 is set by the base station apparatus 3. The base station apparatus 3 notifies the mobile station apparatus 1 of information indicating the set uplink transmission mode by using an RRC (Radio Resource Control) signal or the like. The RRC signal is information used for control of radio resources and transmitted by the PDSCH.

The mobile station apparatus 1 performs blind decoding for the DCI format 0 including the C-RNTI, the DCI format 0 including the SPS C-RNTI, and the DCI format 0 including the T C-RNTI in the uplink transmission mode 1 in the common search space and performs blind decoding for the DCI format 0 including the C-RNTI and the DCI format 0 including the SPS C-RNTI in the mobile station apparatus specific search space.

In the mobile station apparatus 1 in the mode 1, whichever of the RNTI is included in the DCI format 0, the OCC is invalid. The OCC being invalid means that the cyclic shift information included in the uplink grant is not associated with the OCC used for the DMRS. The OCC being valid means that the cyclic shift information included in the uplink grant is associated with the OCC used for the DMRS.

The mobile station apparatus 1 in the mode 2 performs blind decoding for the DCI format 0 including the C-RNTI, the DCI format 0 including the SPS C-RNTI, and the DCI format 0 including the T C-RNTI in the common search space and performs blind decoding for the DCI format 0 and the DCI format 0A including the C-RNTI and the DCI format 0 and the DCI format 0A including the SPS C-RNTI in the mobile station apparatus specific search space.

The mobile station apparatus 1 in the mode 2 determines whether the OCC is valid or invalid on the basis of which of the RNTI is included in the uplink grant (in the DCI format 0 and the DCI format 0A). The mobile station apparatus 1 in the mode 2 determines that the OCC is valid if the C-RNTI is included in the uplink grant.

Moreover, if the SPS C-RNTI is included in the uplink grant and this uplink grant instructs to retransmit the permanently assigned PUSCH, the mobile station apparatus 1 in the mode 2 determines that the OCC is valid. If the uplink grant including the SPS C-RNTI does not instruct to retransmit, the mobile station apparatus 1 in the mode 2 determines that the OCC is invalid.

If the uplink grant including the SPS C-RNTI instructs to retransmit the permanently assigned PUSCH, a value of an NDI of this uplink grant is set to one. If the uplink grant including the SPS C-RNTI instructs to perform activation (or initiation), resetting or release of assignment of the permanently assigned PUSCH, the value of the NDI of this uplink grant is set to zero.

Moreover, if the uplink grant including the SPS C-RNTI does not instruct to retransmit, that is, if the value of the NDI is zero, the cyclic shift information included in the uplink grant is set to a specific code point ('000', for example). The period of the radio resource of the PUSCH permanently assigned to the mobile station apparatus 1 or the like is notified from the base station apparatus 3 to the mobile station apparatus 1 in advance by the RRC signal.

The T C-RNTI is used for instructing the mobile station apparatus 1 to perform retransmission of the random access message 3. However, since the base station apparatus 3 failed in decoding the message 3 including the information for identifying the mobile station apparatus 1, the base station apparatus 3 cannot recognize which mobile station apparatus 1 has transmitted the message 3.

If the mobile station apparatus 1 in the mode 1 invalidates the OCC and performs retransmission of the message 3 and the mobile station apparatus 1 in the mode 2 validates the OCC and transmits the message 3, since the base station apparatus 3 cannot determine whether or not the OCC is applied to the DMRS time-multiplexed with the PUSCH of the message 3 and transmitted, the channel compensation cannot be correctly performed on the PUSCH, and whereby a problem that reception of the message 3 fails is caused.

Then, the mobile station apparatus 1 in the mode 2 determines that the OCC is invalid if the T C-RNTI is included in the DCI format 0 and makes transmission without applying the OCC to the DMRS when retransmitting the message 3. Moreover, the mobile station apparatus 1 also makes transmission without applying the OCC to the DMRS when making initial transmission of the message 3 on the radio resource assigned by a random access response for the random access preamble transmitted by its own apparatus. As a result, the base station apparatus 3 can correctly receive the message 3 by determining that the OCC is never used in the message 3.

In the mobile station apparatus specific search space to the mobile station apparatus 1 in the mode 2, only the DCI format 0 or only the DCI format 0A may be arranged as the uplink grant. In the common search space and/or the mobile station apparatus specific search space, the DCI format other than the DCI formats illustrated in FIG. 5 may be arranged or the DCI format including the RNTI other than the RNTI illustrated in FIG. 5 may be arranged.

FIG. 6 is a diagram illustrating the relationship between the cyclic shift information and the cyclic shift applied to the DMRS when the mobile station apparatus 1 of an embodiment of the present invention determines that the OCC is invalid. When the mobile station apparatus 1 determines that the OCC is invalid, it selects only a parameter for determining the cyclic shift to be applied to the DMRS on the basis of the cyclic shift information.

FIG. 7 is a diagram illustrating the relationship between the cyclic shift information and the cyclic shift applied to the DMRS when the mobile station apparatus 1 of an embodiment of the present invention determines that the OCC is valid. When the mobile station apparatus 1 determines that the OCC is valid, it selects the parameter for determining the cyclic shift to be applied to the DMRS and the OCC to be applied to the DMRS on the basis of the cyclic shift information.

If the base station apparatus 3 changes setting of the uplink transmission mode of the mobile station apparatus 1 and notifies the mobile station apparatus 1 to change the setting of the uplink transmission mode by the RRC signal, the mobile station apparatus 1 changes the uplink transmission mode after a certain time has elapsed since reception of this RRC signal. After changing the uplink transmission mode, the mobile station apparatus 1 notifies the base station apparatus 3 of a message notifying that the change of the uplink transmission mode is completed.

Since the base station apparatus 3 cannot know when the mobile station apparatus 1 changed the uplink transmission mode for a period from notification of a change of the uplink transmission mode to the mobile station apparatus 1 by the RRC signal to reception of the message from the mobile station apparatus 1 notifying that the change of the uplink transmission mode is completed, a period during which the uplink transmission mode of the mobile station apparatus 1 cannot be grasped is generated.

As described above, in a period during which the base station apparatus 3 cannot grasp the uplink transmission mode of the mobile station apparatus 1, the base station apparatus 3 includes the cyclic shift information having a value corresponding to the OCC at [1, 1] having the same DMRS when the OCC is invalidated in the DCI format and transmits the result to the mobile station apparatus 1 in the mode 2. In FIG. 7, the cyclic shift information having values of "000", "001", "011", and "110" corresponds to the OCC at [1, 1].

As a result, even if the uplink transmission mode of the mobile station apparatus 1 is the mode 2 and the OCC has been validated in the period during which the base station apparatus 3 cannot grasp the uplink transmission mode of the mobile station apparatus 1, the mobile station apparatus 1 uses only the OCC at [1, 1] having the same DMRS when the OCC is invalidated, and thus, regardless of the uplink transmission mode of the mobile station apparatus 1, the base station apparatus 3 can correctly receive the PUSCH by performing reception processing of the PUSCH, assuming that the mobile station apparatus 1 is not using the OCC.

If the base station apparatus 3 does not know the uplink transmission mode of the mobile station apparatus 1 when the mobile station apparatus 1 makes an initial access to the base station apparatus 3, the base station apparatus 3 cannot correctly receive the PUSCH transmitted by the mobile station apparatus 1, and thus, a default uplink transmission mode needs to be determined. In the present invention, the uplink transmission mode of the mobile station apparatus 1 when the mobile station apparatus 1 makes an initial access to the base station apparatus 3 is set to the mode 1 whose transmission processing of the DMRS is easy.

An operation of the apparatus of the present invention will be described below.

Figure 8:
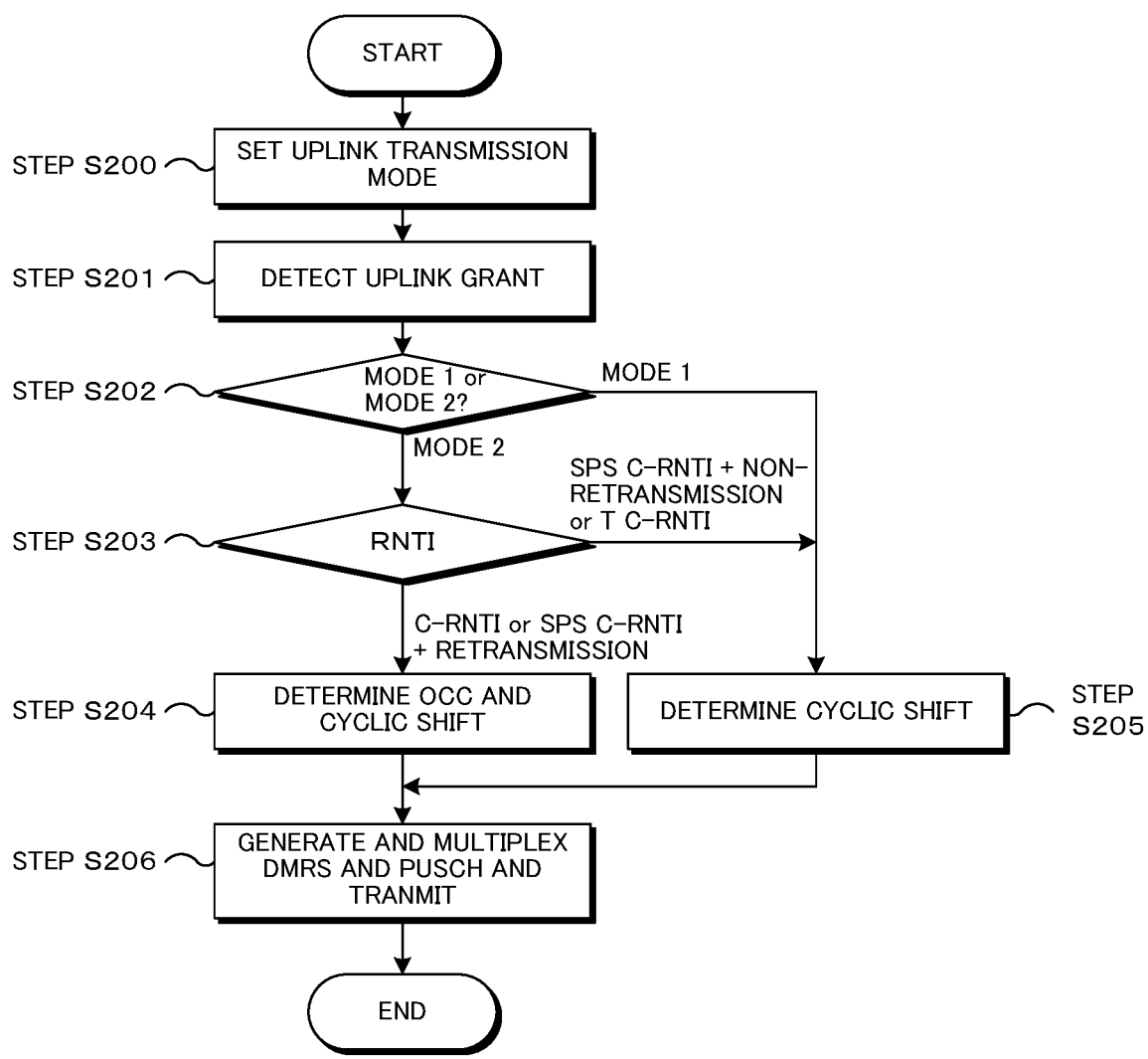
FIG. 8 is a flowchart illustrating an example of an operation of the mobile station apparatus 1 of an embodiment of the present invention.

FIG. 8 is a flowchart illustrating an example of the operation of the mobile station apparatus 1 of an embodiment of the present invention. The mobile station apparatus 1 sets the uplink transmission mode notified from the base station apparatus 3 (Step S200). The mobile station apparatus 1 performs blind decoding of the uplink grant and detects the uplink grant (Step S201). The mobile station apparatus 1 determines whether the uplink transmission mode of its own apparatus is the mode 1 or the mode 2 (Step S202). If the mobile station apparatus 1 determines that the uplink transmission mode of its own apparatus is the mode 2, it determines whether the OCC is to be applied to the DMRS on the basis of the RNTI included in the uplink grant (Step S203).

If the uplink grant includes the SPS C-RNTI assigned to its own apparatus and retransmission is ordered and if the uplink grant includes the C-RNTI assigned to its own apparatus, the mobile station apparatus 1 determines the OCC and the cyclic shift to be applied to the DMRS on the basis of the cyclic shift information in the uplink grant (Step S204).

If the uplink grant includes the SPS C-RNTI assigned to its own apparatus and retransmission is not ordered, or if the uplink grant includes the T C-RNTI corresponding to the random access message 3, the mobile station apparatus 1 determines only the cyclic shift to be applied to the DMRS on the basis of the cyclic shift information in the uplink grant (Step S205).

If the mobile station apparatus 1 determines that the uplink transmission mode of its own apparatus is the mode 1 at Step S202, the routine proceeds to Step S205. The mobile station apparatus 1 applies the cyclic shift and the OCC, as necessary, determined at Step S204 or Step S205 to the DMRS, time-multiplexes the DMRS and PUSCH and transmits the result (Step S206).

Figure 9:
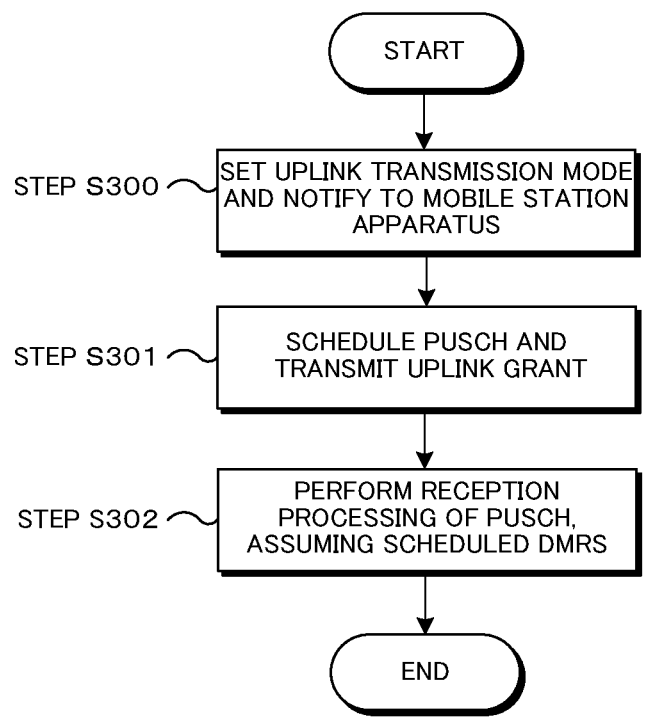
FIG. 9 is a flowchart illustrating an example of an operation of the base station apparatus 3 of an embodiment of the present invention.

FIG. 9 is a flowchart illustrating an example of an operation of the base station apparatus 3 of an embodiment of the present invention. The base station apparatus 3 notifies the mobile station apparatus 1 of the transmission mode set for the mobile station apparatus 1 by using the RRC signal or the like (Step S300).

The base station apparatus 3 schedules the PUSCH and transmits the uplink grant indicating the radio resource for the scheduled PUSCH to the mobile station apparatus 1 (Step S301). The base station apparatus 3 includes the cyclic shift information corresponding only to the parameter for determining the cyclic shift used for the DMRS in the uplink grant corresponding to the mobile station apparatus 1 set to the mode 1. The base station apparatus 3 includes the cyclic shift information corresponding only to the parameter for determining the cyclic shift used for the DMRS in the uplink grant assigning the radio resource of the PUSCH used for retransmitting the message 3 including T C-RNTI.

The base station apparatus 3 includes the cyclic shift information corresponding to the parameter for determining the cyclic shift used for the DMRS and the OCC used for the DMRS in the uplink grant including C-RNTI corresponding to the mobile station apparatus 1 set to the mode 2. The base station apparatus 3 includes the cyclic shift information corresponding to the parameter for determining the cyclic shift used for the DMRS and the OCC used for the DMRS in the uplink grant including the SPS C-RNTI and ordering retransmission of the PUSCH corresponding to the mobile station apparatus 1 set to the mode 2.

The base station apparatus 3 includes the cyclic shift information corresponding only to the parameter for determining the cyclic shift used for the DMRS in the uplink grant including the SPS C-RNTI and not ordering retransmission of the PUSCH corresponding to the mobile station apparatus 1 set to the mode 2. The base station apparatus 3 receives the PUSCH and the DMRS in compliance with the uplink grant transmitted to the mobile station apparatus 1 at Step S301, performs channel compensation of the PUSCH by using the DMRS, and executes decoding processing of the PUSCH (Step S302).

As described above, in the embodiment of the present invention, in the radio communication system in which the base station apparatus 3 and the mobile station apparatus 1 perform radio communication with each other, the base station apparatus 3 transmits the uplink grant (first control information) including the cyclic shift information corresponding to the parameter for determining the cyclic shift used for the DMRS (reference signal) time-multiplexed with the PUSCH (data channel) and transmitted by the mobile station apparatus 1 and the uplink grant (second control information) including the above-described cyclic shift information corresponding to the parameter for determining the cyclic shift used for the DMRS and the OCC (diffusion code) used for the DMRS by including different RNTI (identifier) therein.

Then, the mobile station apparatus 1 determines by the RNTI included in the detected uplink grant whether the cyclic shift information included in the detected uplink grant corresponds to the parameter for determining the cyclic shift used for the DMRS time-multiplexed with the PUSCH and the OCC used for the DMRS or corresponds only to the parameter for determining the cyclic shift used for the DMRS time-multiplexed with the PUSCH.

As a result, the base station apparatus 3 can accurately recognize whether or not the mobile station apparatus 1 applies the OCC to the DMRS time-multiplexed with the PUSCH, and thus, the base station apparatus 3 can correctly perform channel compensation of the PUSCH by using the DMRS and decode the PUSCH.

Second Embodiment

A second embodiment of the present invention will be described below in detail by referring to the attached drawings.

In the second embodiment of the present invention, the base station apparatus 3 arranges the uplink grant (first control information) including the cyclic shift information corresponding only to the parameter for determining the cyclic shift used for the DMRS in the common search space (first search space) and arranges the uplink grant (second control information) including the cyclic shift information corresponding to the parameter for determining the cyclic shift used for the DMRS and the OCC used for the DMRS in the mobile station apparatus specific search space (second search space).

In the second embodiment of the present invention, the mobile station apparatus 1 discriminates whether the cyclic shift information included in the detected uplink grant corresponds only to the parameter for determining the cyclic shift used for the DMRS or corresponds to the parameter for determining the cyclic shift used for the DMRS and the OCC used for the DMRS on the basis of which of the common search space and the mobile station apparatus specific search space the uplink grant is detected in.

FIG. 10 is a diagram illustrating a relationship between the uplink grant and the OCC applied to the DMRS in the second embodiment of the present invention. The mobile station apparatus 1 of the second embodiment includes the mode 1 not using the OCC for the DMRS time-multiplexed with the PUSCH and the mode 2 using the OCC for the DMRS time-multiplexed with the PUSCH as the uplink transmission mode.

The mobile station apparatus 1 performs blind decoding in the DCI format 0 including the C-RNTI, the DCI format 0 including the SPS C-RNTI, and the DCI format 0 including the T C-RNTI in the common search space and performs blind decoding in the DCI format 0 including the C-RNTI and the DCI format 0 including the SPS C-RNTI in the mobile station apparatus specific search space in the uplink transmission mode 1. In mode 1, whichever of the search spaces the DCI format 0 is detected, the OCC is invalid.

The mobile station apparatus 1 in the uplink transmission mode 2 performs blind decoding in the DCI format 0 including the C-RNTI, the DCI format 0 including the SPS C-RNTI, and the DCI format 0 including the T C-RNTI in the common search space and performs blind decoding in the DCI format 0 and the DCI format 0A including the C-RNTI and the DCI format 0 and the DCI format 0A including the SPS C-RNTI in the mobile station apparatus specific search space.

The mobile station apparatus 1 in the mode 2 determines whether the OCC is valid or invalid on the basis of which of the common search space or the mobile station apparatus specific search space the DCI format 0 and the DCI format 0A are detected in. The mobile station apparatus 1 in the mode 2 determines that the OCC is invalid if the DCI format 0 is detected in the common search space. The mobile station apparatus 1 in the mode 2 determines that the OCC is valid if the DCI format 0 and the DCI format 0A including the C-RNTI are detected in the mobile station apparatus specific search space. Since the mobile station apparatus 1 in the mode 2 monitors the DCI format 0A only in the mobile station apparatus specific search space, the DCI format 0A has the OCC valid all the time.

The mobile station apparatus 1 in the mode 2 determines that the OCC is valid if the DCI format 0 and the DCI format 0A including the SPS C-RNTI and ordering retransmission are detected in the mobile station apparatus specific search space. The mobile station apparatus 1 in the mode 2 determines that the OCC is invalid if the DCI format 0 and the DCI format 0A including the SPS C-RNTI and not ordering retransmission are detected in the mobile station apparatus specific search space.

If at least a part of the common search space and the mobile station apparatus specific search space are overlapped, there is a problem that the mobile station apparatus 1 cannot determine whether the DCI format 0 detected in the overlapped space is arranged in the common search space and the OCC is invalid or it is arranged in the mobile station apparatus specific search space and the OCC is valid.

The overlap of the common search space and the mobile station apparatus specific search space means that the PDCCH candidates constituting the common search space and the PDCCH candidates constituting the mobile station apparatus specific search space are all composed of the same control channel elements. In FIG. 4, the PDCCH candidate composed of eighth to fifteenth control channel elements is a space where the common search space and the mobile station apparatus specific search space are overlapped.

Then, in the present invention, if the DCI format 0 being able to be arranged in both the common search space and the mobile station apparatus specific search space is to be arranged in a space where the common search space and the mobile station apparatus specific search space are overlapped, in which of the search spaces the DCI format 0 is arranged is determined in advance. If the mobile station apparatus 1 detects the DCI format 0 being able to be arranged in both the common search space and the mobile station apparatus specific search space in the space where the common search space and the mobile station apparatus specific search space are overlapped, the mobile station apparatus 1 determines that it is the DCI format to be arranged in the search space determined in advance.

If the DCI format 0 is detected in the space where the common search space and the mobile station apparatus specific search space are overlapped, for example, it is determined in advance that the DCI format 0 is to be arranged in the common search space and the mobile station apparatus 1 determines that the OCC is invalid.

As a result, in the period from transmission of the RRC signal instructing the mobile station apparatus 1 to change the uplink transmission mode to reception of the message from the mobile station apparatus 1 notifying that the change of the uplink transmission mode has been completed when the base station apparatus 3 can not grasp the uplink transmission mode of the mobile station apparatus 1, the mobile station apparatus 1 determines that the OCC is invalid all the time regardless of the uplink transmission mode by using the DCI format 0 arranged in the common search space and thus, the base station apparatus 3 can correctly recognize whether or not the mobile station apparatus 1 applies the OCC to the DMRS time-multiplexed with the PUSCH.

Since the base station apparatus 3 can perform radio communication with the mobile station apparatus 1 by using the uplink grant including the C-RNTI in the common search space in the above period, the OCC of the uplink grant including the SPS C-RNTI in the common search space may be made valid.

Moreover, the present invention may employ the following mode. That is, the radio communication system of the present invention is a radio communication system in which the base station apparatus and the mobile station apparatus perform radio communication with each other, wherein the base station apparatus includes the cyclic shift information corresponding to the parameter for determining the cyclic shift used for the reference signal transmitted from the mobile station apparatus in the first control information, includes the cyclic shift information corresponding to the parameter for determining the cyclic shift used for the reference signal and the spread code used for the reference signal in the second control information and transmits the first control information or the second control information to the mobile station apparatus, while the mobile station apparatus applies only the cyclic shift to the reference signal in case that the first control information was detected, applies the cyclic shift and the spread code to the reference signal and transmits the reference signal in case that the second control information was detected.

Moreover, in the radio communication system of the present invention, the base station apparatus includes the first RNTI in the first control information and includes the second RNTI in the second control information, while the mobile station apparatus discriminates whether the detected control information is the first control information or the second control information on the basis of whether the detected control information includes the first RNTI or the second RNTI.

Furthermore, in the radio communication system of the present invention, the base station apparatus sets the first mode in which the mobile station apparatus is made to monitor only the first control information or the second mode in which the mobile station apparatus is made to monitor at least the second control information and transmits only the cyclic shift information corresponding to the spread signal at [1, 1] included in the second control information for a period from notification of the setting to the mobile station apparatus to reception of the message notifying that the setting is completed from the mobile station apparatus.

Moreover, in the radio communication system of the present invention, the base station apparatus arranges the first control information in the first search space and arranges the second control information in the second search space, while the mobile station apparatus discriminates which of the first control information and the second control information is the detected control information on the basis of which of the first search space and the second search space the control information is detected in.

In addition, in the radio communication system of the present invention, in the space where the first search space and the second search space are overlapped, the base station apparatus arranges only the first control information or second control information, while, if the control information is detected in the overlapped space, the mobile station apparatus determines that the first control information or the second control information is detected.

Moreover, the base station apparatus of the present invention is a base station apparatus that performs radio communication with the mobile station apparatus, wherein the base station apparatus includes the cyclic shift information corresponding to the parameter for determining the cyclic shift used for the reference signal transmitted by the mobile station apparatus in the first control information, includes the parameter for determining the cyclic shift used for the reference signal and the cyclic shift information corresponding to the spread code used for the reference signal in the second control information, and transmits the first control information or the second control information to the mobile station apparatus.

Furthermore, the mobile station apparatus of the present invention is a mobile station apparatus that performs radio communication with the base station apparatus, wherein, in case that the first control information including the cyclic shift information corresponding to the parameter for determining the cyclic shift used for the reference signal transmitted by its own apparatus was detected, the mobile station apparatus applies only the cyclic shift to the reference signal, while in case that the second control information including the parameter for determining the cyclic shift used for the reference signal and the cyclic shift information corresponding to the spread code used for the reference signal was detected, the cyclic shift and the spread code are applied to the reference signal, and the reference signal is transmitted.

Moreover, the radio communication method of the present invention is a radio communication method used in the base station apparatus that performs radio communication with the mobile station apparatus and includes the steps of including the cyclic shift information corresponding to the parameter for determining the cyclic shift used for the reference signal transmitted by the mobile station apparatus in the first control information, including the parameter for determining the cyclic shift used for the reference signal and the cyclic shift information corresponding to the spread code used for the reference signal in the second control information, and transmitting the first control information or the second control information to the mobile station apparatus.

Furthermore, the radio communication method of the present invention is a radio communication method used in the mobile station apparatus that performs radio communication with the base station apparatus and includes the steps of applying, if the first control information including the cyclic shift information corresponding to the parameter for determining the cyclic shift used for the reference signal transmitted by its own apparatus was detected, only the cyclic shift to the reference signal, applying, if the second control information including the parameter for determining the cyclic shift used in the reference signal and the cyclic shift information corresponding to the spread code used for the reference signal was detected, the cyclic shift and the spread code to the reference signal, and transmitting the reference signal.

In addition, the integrated circuit of the present invention is an integrated circuit used in the base station apparatus that performs radio communication with the mobile station apparatus and includes functions of including the cyclic shift information corresponding to the parameter for determining the cyclic shift used for the reference signal transmitted by the mobile station apparatus in the first control information, including the parameter for determining the cyclic shift used for the reference signal and the cyclic shift information corresponding to the spread code used for the reference signal in the second control information, and transmitting the first control information or the second information to the mobile station apparatus.

Moreover, the integrated circuit of the present invention is an integrated circuit used in the mobile station apparatus that performs radio communication with the base station apparatus and includes functions applying, if the first control information including the cyclic shift information corresponding to the parameter for determining the cyclic shift used for the reference signal transmitted by its own apparatus was detected, only the cyclic shift to the reference signal, applying, if the second control information including the parameter for determining the cyclic shift used in the reference signal and the cyclic shift information corresponding to the spread code used for the reference signal was detected, the cyclic shift and the spread code to the reference signal, and transmitting the reference signal.

The program operated in the base station apparatus 3 and the mobile station apparatus 1 relating to the present invention may be a program (a program for having a computer function) for controlling the CPU (Central Processing Unit) and the like so that the functions of the above-described embodiment relating to the present invention are realized. The information handled by these apparatuses is temporarily stored in a RAM (Random Access Memory) during the processing thereof, and then, stored in various ROMs such as a Flash ROM (Read Only Memory) and HDDs (Hard Disk Drive), and read out, modified/written by the CPU as necessary.

A part of the mobile station apparatus 1 and the base station apparatus 3 in the above-described embodiment may be realized by a computer. In that case, the program for realizing the control function is recorded in a computer-readable recording medium, and the program recorded in the recording medium may be read in and executed by the computer system so as to be realized.

The "computer system" here means a computer system incorporated in the mobile station apparatus 1 or the base station apparatus 3 and is assumed to include OS and hardware such as peripheral equipment. Moreover, the "computer-readable recording medium" refers to a portable medium such as a flexible disk, a magneto optical disk, a ROM, a CD-ROM and the like and a storage device such as a hard disk incorporated in the computer system.

Moreover, the "computer-readable recording medium" may include those holding the program dynamically for a short time such as a communication line when the program is transmitted through a communication line such as a network including the Internet and a telephone line and the like and those holding the program for a given time such as a volatile memory inside the computer system which becomes a server and a client in that case. Moreover, the above-described programs may be such as to realize a part of the above-described functions or may be able to be realized by a combination with the program already recorded in the computer system.

Furthermore, a part of or the whole of the mobile station apparatus 1 and the base station apparatus 3 in the above-described embodiment may be realized as an LSI which is typically an integrated circuit or may be realized as a chip set. Each functional block of the mobile station apparatus 1 and the base station apparatus 3 may be individually made into a chip or a part of or the whole of them may be integrated and made into a chip. Moreover, a method of making them into an integrated circuit is not limited to the LSI but may be realized by a dedicated circuit or a general-purpose processor. Moreover, if a technology of making an integrated circuit which replaces the LSI emerges due to a progress in the semiconductor technology, the integrated circuit by that technology can be also used.

The embodiment of this invention has been described in detail by referring to the attached drawings, but the specific configuration is not limited to those described above but is capable of various design changes and the like within a range not departing from the gist of this invention.

REFERENCE SIGNS LIST

1 (1A, 1B, 1C) mobile station apparatus
3 base station apparatus
101 higher layer processing unit
103 control unit
105 reception unit
107 transmission unit
301 higher layer processing unit
303 control unit
305 reception unit
307 transmission unit
1011 radio resource control unit
1013 determination unit
3011 radio resource control unit
3013 downlink control information generation unit

The invention claimed is:

1. A terminal device comprising:
a reception circuit configured and programmed to or configured to receive downlink control information on a physical downlink control channel; and
a transmission circuit configured and programmed to or configured to transmit a transport block on a physical uplink shared channel based on a detection of the physical downlink control channel with the downlink control information, wherein
a demodulation reference signal sequence of a demodulation reference signal associated with the transmission of the physical uplink shared channel is generated based on at least a certain sequence; and
the certain sequence is given based on at least which specific radio network temporary identifier was used from among a plurality of radio network temporary identifiers to transmit the downlink control information for the transport block associated with the transmission of the physical uplink shared channel,
wherein the plurality of radio network temporary identifiers include a cell radio network temporary identifier (C-RNTI) and a temporary C-RNTI,
wherein the specific radio network temporary identifier is used to give the certain sequence,
wherein the specific radio network temporary identifier scrambles a Cyclic Redundancy Check (CRC),
wherein the certain sequence is given by different calculation methods depending on whether the specific radio network temporary identifier is the C-RNTI or the temporary C-RNTI.

2. A base station device comprising:
a transmission circuit configured and programmed to or configured to transmit downlink control information on a physical downlink control channel to a terminal device; and
a reception circuit configured and programmed to or configured to receive:
a demodulation reference signal associated with a physical uplink shared channel from the terminal device, the physical uplink shared channel being transmitted by the terminal device based on a detection of the physical downlink control channel with the downlink control information; and
a transport block on the physical uplink shared channel from the terminal device, wherein
a demodulation reference signal sequence of a demodulation reference signal associated with the transmission of the physical uplink shared channel is generated based on at least a certain sequence; and
the certain sequence is given based on at least which specific radio network temporary identifier was used from among a plurality of radio network temporary identifiers to transmit the downlink control information for the transport block associated with the transmission of the physical uplink shared channel,
wherein the plurality of radio network temporary identifiers include a cell radio network temporary identifier (C-RNTI) and a temporary C-RNTI,
wherein the specific radio network temporary identifier is used to give the certain sequence,
wherein the specific radio network temporary identifier scrambles a Cyclic Redundancy Check (CRC),
wherein the certain sequence is given by different calculation methods depending on whether the specific radio network temporary identifier is the C-RNTI or the temporary C-RNTI.

3. A radio communication method used for a terminal device comprising the steps of:
- receiving downlink control information on a physical downlink control channel; and
- transmitting a transport block on a physical uplink shared channel based on a detection of the physical downlink control channel with the downlink control information, wherein
- a demodulation reference signal sequence of a demodulation reference signal associated with the transmission of the physical uplink shared channel is generated based on at least a certain sequence; and
- the certain sequence is given based on at least which specific radio network temporary identifier was used from among a plurality of radio network temporary identifiers to transmit the downlink control information for the transport block associated with the transmission of the physical uplink shared channel,
- wherein the plurality of radio network temporary identifiers include a cell radio network temporary identifier (C-RNTI) and a temporary C-RNTI,
- wherein the specific radio network temporary identifier is used to give the certain sequence,
- wherein the specific radio network temporary identifier scrambles a Cyclic Redundancy Check (CRC),
- wherein the certain sequence is given by different calculation methods depending on whether the specific radio network temporary identifier is the C-RNTI or the temporary C-RNTI.

4. A radio communication method used for a base station device comprising the steps of:
- transmitting downlink control information on a physical downlink control channel to a terminal device; and
- receiving:
  - a demodulation reference signal associated with a physical uplink shared channel from the terminal device, the physical uplink shared channel being transmitted by the terminal device based on a detection of the physical downlink control channel with the downlink control information; and
  - a transport block on the physical uplink shared channel from the terminal device,
- wherein a demodulation reference signal sequence of a demodulation reference signal associated with the transmission of the physical uplink shared channel is generated based on at least a certain sequence; and
- the certain sequence is given based on at least which specific radio network temporary identifier was used from among a plurality of radio network temporary identifiers to transmit the downlink control information for the transport block associated with the transmission of the physical uplink shared channel,
- wherein the plurality of radio network temporary identifiers include a cell radio network temporary identifier (C-RNTI) and a temporary C-RNTI,
- wherein the specific radio network temporary identifier is used to give the certain sequence,
- wherein the specific radio network temporary identifier scrambles a Cyclic Redundancy Check (CRC),
- wherein the certain sequence is given by different calculation methods depending on whether the specific radio network temporary identifier is the C-RNTI or the temporary C-RNTI.

* * * * *

UNITED STATES PATENT AND TRADEMARK OFFICE
CERTIFICATE OF CORRECTION

PATENT NO. : 10,856,279 B2  
APPLICATION NO. : 15/828470  
DATED : December 1, 2020  
INVENTOR(S) : Shoichi Suzuki et al.

Page 1 of 1

It is certified that error appears in the above-identified patent and that said Letters Patent is hereby corrected as shown below:

On the Title Page

The following should be added:  
(30) Foreign Application Priority Data  
May 27, 2010 (JP).........................2010-121258

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*